(12) United States Patent
Baliga et al.

(10) Patent No.: US 7,139,359 B2
(45) Date of Patent: Nov. 21, 2006

(54) INTEGRATED HEAD ASSEMBLY FOR A NUCLEAR REACTOR

(75) Inventors: Ravi Baliga, San Ramon, CA (US); Key Y. Choi, Burlingame, CA (US)

(73) Assignee: Advent Engineering Services, Inc., San Ramon, CA (US)

( * ) Notice: Subject to any disclaimer, the term of this patent is extended or adjusted under 35 U.S.C. 154(b) by 194 days.

(21) Appl. No.: 10/980,392

(22) Filed: Nov. 2, 2004

(65) Prior Publication Data

US 2006/0034414 A1   Feb. 16, 2006

Related U.S. Application Data

(63) Continuation of application No. 10/620,101, filed on Jul. 14, 2003, now abandoned, which is a continuation of application No. 10/012,193, filed on Dec. 5, 2001, now abandoned, which is a continuation-in-part of application No. 09/921,363, filed on Aug. 2, 2001, now Pat. No. 6,546,066.

(60) Provisional application No. 60/311,328, filed on Aug. 9, 2001.

(51) Int. Cl.
   *G21C 9/00*       (2006.01)
(52) U.S. Cl. .................... 376/287; 376/277; 376/293; 376/260
(58) Field of Classification Search ............... 376/298, 376/294, 287, 263, 260, 277, 293
   See application file for complete search history.

(56) References Cited

U.S. PATENT DOCUMENTS

| | | | |
|---|---|---|---|
| 3,937,651 A | 2/1976 | Schabert et al. | |
| 4,050,986 A | 9/1977 | Ference et al. | |
| 4,112,854 A * | 9/1978 | Pitchford | 108/56.1 |
| 4,113,558 A | 9/1978 | Wade | |
| 4,302,290 A | 11/1981 | Mazur et al. | |
| 4,427,621 A | 1/1984 | Gillett et al. | |
| 4,654,188 A | 3/1987 | Hankinson et al. | |
| 4,666,657 A | 5/1987 | Altman | |
| 4,678,623 A | 7/1987 | Malandra et al. | |
| 4,828,789 A | 5/1989 | Hankinson et al. | |
| 4,830,814 A | 5/1989 | Altman | |
| 5,069,143 A * | 12/1991 | Bunger | 108/57.2 |

(Continued)

OTHER PUBLICATIONS

Ball, M.G., et al., "Plant Equipment Improvements for Outage Optimization," *13th Korean Atomic Industry Forum/Korean Nuclear Society Annual Conference*, Seoul, Korea, 1998, pp. 483-495.

(Continued)

*Primary Examiner*—R Palabrica
(74) *Attorney, Agent, or Firm*—Christensen O'Connor Johnson Kindness PLLC

(57) ABSTRACT

An integrated head assembly (100) is disclosed for a nuclear reactor. The preferred integrated head assembly includes a lift assembly (150) that supports the reactor vessel closure head (90) and integrated head assembly for removal, a separate support structure (202) supported by a ring beam (151) that sets atop the reactor vessel closure head, a shroud assembly (200), a seismic support system (300), a baffle assembly (500), a missile shield (400), and a CRDM cooling system. The CRDM cooling system draws cooling air into the baffle assembly, downwardly past the CRDMs (96), outwardly to upright air ducts (600), upwardly to an upper plenum (680), and out of the assembly through the air fans (190). In a second embodiment the integrated head assembly (1100) includes a missile shield (1400) and CRDM cooling system (1600) that permits access to individual CRDMs from above.

12 Claims, 17 Drawing Sheets

U.S. PATENT DOCUMENTS

| | | |
|---|---|---|
| 5,201,112 A | 4/1993 | Sevelinge |
| 5,225,150 A | 7/1993 | Malandra et al. |
| 5,715,288 A | 2/1998 | Matteson |
| 5,737,378 A | 4/1998 | Ballas et al. |
| 5,742,652 A | 4/1998 | Hankinson et al. |
| 5,930,321 A | 7/1999 | Harkness et al. |
| 5,999,584 A | 12/1999 | Adams et al. |
| 6,009,137 A | 12/1999 | Matsumoto et al. |
| 6,061,415 A * | 5/2000 | Harkness et al. ........... 376/298 |
| 6,533,122 B1 * | 3/2003 | Plunkett ..................... 206/600 |

OTHER PUBLICATIONS

Kim, I.-Y., et al., "Integrated Head Assembly for Korean Next Generation Reactor," *Transactions of the 15th International Conference on Structural Mechanics in Reactor Technology*, Seoul, Korea, Aug. 15-20, 1999, pp. XI 315-321.

\* cited by examiner

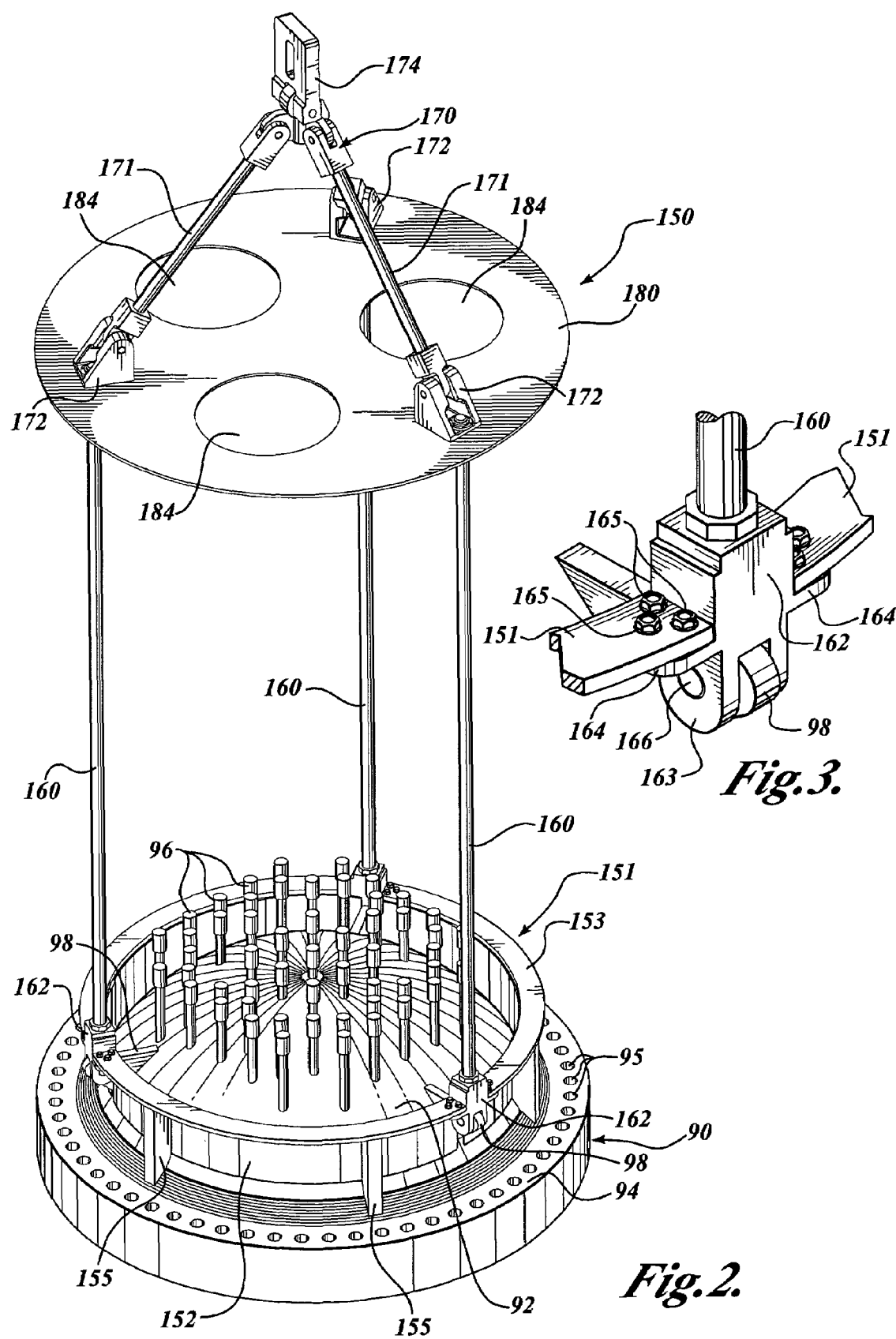

INTEGRATED HEAD ASSEMBLY FOR A NUCLEAR REACTOR

CROSS-REFERENCES TO RELATED APPLICATIONS

This application is a continuation of U.S. patent application Ser. No. 10/620,101, filed Jul. 14, 2003, now abandoned which is a continuation of application Ser. No. 10/012,193, filed Dec. 5, 2001, now abandoned which is a continuation-in-part of prior U.S. patent application Ser. No. 09/921,363, filed Aug. 2, 2001 (now U.S. Pat. No. 6,546,066), priority from the filing date of which is hereby claimed under 35 U.S.C. § 120. This application also claims the benefit of U.S. Provisional Patent Application No. 60/311,328 filed Aug. 9, 2001, under 35 U.S.C. § 119.

FIELD OF THE INVENTION

This invention relates to reactor vessel closure head assemblies and, in particular, to an integrated head assembly for a pressurized light water reactor.

BACKGROUND OF THE INVENTION

In a typical pressurized water reactor (PWR) power plant, various mechanical components and systems are installed on the reactor vessel closure head. These mechanical components and systems include, for example, a control rod drive mechanism (CRDM) cooling system, a reactor vessel closure head lift rig, CRDM seismic restraints, and a CRDM missile shield. Each of these components is typically designed and installed as a permanent fixture to perform designated functions during plant operation. However, during refueling of the reactor these components have to be disassembled in order to remove the reactor vessel closure head from the reactor vessel. These components are stored in designated storage areas, generally inside the reactor containment. Typically, in a PWR plant, a series of steps are followed before the reactor vessel closure head is removed from the reactor vessel. The operational steps that are performed prior to detensioning the reactor vessel closure head studs include some or all of the following:

Remove and store heavy concrete missile shields.
Remove and store the CRDM cooling ducts.
Remove the seismic restraints.
Disconnect and store the CRDM power and rod position indicator cables.
Install the reactor head lifting rig tripod.
Remove cable trays and cables running from the reactor head to the operating deck or walls.
Disconnect heated junction thermocouples, nuclear steam supply system instrumentation, monitoring system cables, and reactor head vent lines.
Install temporary lead shield blankets around the vessel closure head area.
The procedure also requires that the nuts and washers be removed from the reactor vessel closure head and placed in storage racks during preparation for refueling. The storage racks are then removed from the refueling cavity and stored at convenient locations inside containment prior to reactor vessel closure head removal and refueling cavity flooding. The above steps are then reversed while reinstalling the reactor vessel closure head and the related reactor systems.

Each of these steps contributes significantly to the total cost associated with refueling the reactor. The total costs include costs associated with personnel man-hours required to perform the refueling, power plant down time and consequent loss of electricity production, radiation exposure to personnel, and potential human errors. In addition, the various components that must be removed for refueling activities require a large amount of the limited storage space available inside containment and raise the risk of inadvertent contamination of work and storage areas.

Concepts and designs for integrating some of the reactor vessel closure head systems into a modular integrated head design have been proposed. For example, in U.S. Pat. No. 4,678,623 to Malandra et al., a modular head assembly is disclosed wherein vertical lift rods are attached to the reactor vessel lifting lugs, and a missile shield, seismic support platform, CRDM cooling system, and lift rig are supported by the lift rods above the reactor vessel closure head. Because most or all of the modular head assembly taught by Malandra et al. is supported by the lift rods, however, very large loads are concentrated at the clevis connection at the reactor vessel closure head lifting lugs, which may cause damage to the lifting lugs and/or the body of the reactor vessel closure head. In addition, very heavy components such as the missile shield and the fans are supported at the distal ends of three relatively long lift rods, resulting in an unstable structure that may subject the lift rods to undesirable compressive, bending and torsional stresses. Malandra et al. also does not provide a structure for putting a shroud around the CRDMs.

In U.S. Pat. No. 4,830,814, Altman discloses an integrated head package having a missile shield that is slidably mounted near the distal end of three lift rods connecting to the reactor vessel closure head lifting lugs. A shroud is shown disposed about the CRDMs. Similar to the apparatus disclosed by Malandra et al., however, the heavy missile shield and lifting rig are installed at the distal end of three elongate lift rods that are connected at their proximal end to the reactor vessel closure head lifting lugs. The Altman apparatus, therefore, will also produce relatively high local loads in the reactor vessel lifting lugs and head. Altman also does not disclose any system for cooling the CRDMs.

Some commercial light water reactors—for example, pressurized water reactors produced by Babcock & Wilcox (B&W)—have a reactor vessel closure head having inverted L-shaped flanges that extend upwardly from the reactor vessel closure head. Many B&W reactors also employ a control rod design wherein the lead screw from each control rod must be decoupled from the control rod and parked before the reactor vessel closure head is removed from the reactor vessel. In order to decouple and park the control rod lead screw, a 15-foot tool is typically inserted from above into the CRDM housing. For these types of commercial reactors, therefore, significant overhead space, or headroom, is required above the reactor vessel to accommodate the control rod tool, prior to removing the reactor vessel closure head. To provide the necessary head room, various components disposed above the reactor may need to be disassembled, removed, and stored before the control rod lead screws can be decoupled and parked and the closure head removed.

There is a need, therefore, for an integrated head assembly for a pressurized water reactor that can be removed from the reactor vessel integrally with the reactor vessel closure head, and that does not introduce undue local stresses at the reactor vessel closure head and lifting lugs.

SUMMARY OF THE INVENTION

The present invention is directed to an apparatus and method that satisfies this need. The apparatus includes an integrated head assembly for a pressurized light water nuclear reactor having a lift assembly that engages the lifting lugs on the reactor vessel closure head. A support structure is provided above the reactor vessel closure head with a shroud assembly and a baffle structure attached thereto. At least one upwardly extending duct for a CRDM cooling system is also provided. The apparatus includes a seismic support system and a missile shield attached to the support structure and disposed generally above the control rod drive mechanisms. At least one cooling air fan is fluidly connected to the duct.

In an embodiment of the invention, the duct is cooperatively formed by the baffle and the shroud assemblies.

In an embodiment of the invention, the support structure includes a ring beam with a number of saddle members that are disposed atop the reactor vessel closure head. The ring beam may be formed from three annular segments that are joined end to end. The support structure may also include a cylindrical support grid that extends upwardly from the ring beam. The shroud assembly may also comprise multiple axial segments and provide air inlet port(s) for the air cooling system. In a disclosed embodiment, the air cooling system includes an upper plenum interconnecting three cooling fans and two vertical ducts.

An embodiment of a method for retrofitting a pressurized water nuclear reactor according to the present invention includes shutting down the nuclear reactor and removing the reactor vessel closure head from the reactor vessel and placing it on a reactor head stand. Lift rods are then attached to the lifting lugs on the reactor vessel closure head. An integrated head assembly module is then installed, the module including a ring beam that rests atop the reactor vessel closure head, a shroud assembly that sets atop the ring beam, and a baffle assembly attached to the shroud assembly. A seismic support system is then connected to the control rod drive mechanisms and a missile shield is installed above the CRDMs. A lifting assembly is then operatively attached to the lift rods above the missile shield, and the reactor vessel closure head is reinstalled on the reactor vessel.

In yet another embodiment of the present invention, an integrated head assembly includes a lower ring beam that is disposed atop the reactor vessel closure head, lift rods that attach to the vessel head lifting lugs, a shroud assembly with cooling air ducts that is supported by the ring beam, a seismic support assembly and missile shield assembly installed above the reactor vessel closure head, and fans connected to the cooling air ducts. An upper ring beam and lifting tripod may be provided at the upper end of the lift rods, wherein the upper ring beam acts as a spreader for the lifting tripod. The upper ring beam is annular, providing access to the upper portion of the integrated head assembly.

In a disclosed embodiment, the missile shield assembly includes an array of shield plates, each shield plate positioned above a control rod drive mechanism, the shield plates being removable such that individual control rod drive mechanisms can be accessed from above. The shield plates are slidably retained between grooved beams and a center shield plate in each row is removable, allowing adjacent shield plates to be slid to access the desired control rod drive mechanism.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a perspective view of the lift assembly portion of the integrated head assembly shown in FIG. 1;

FIG. 3 is a close-up fragmentary view of the connecting member of the lift rods shown in FIG. 2, shown connected to the ring beam;

DETAILED DESCRIPTION OF THE PREFERRED EMBODIMENT

Figure 1:
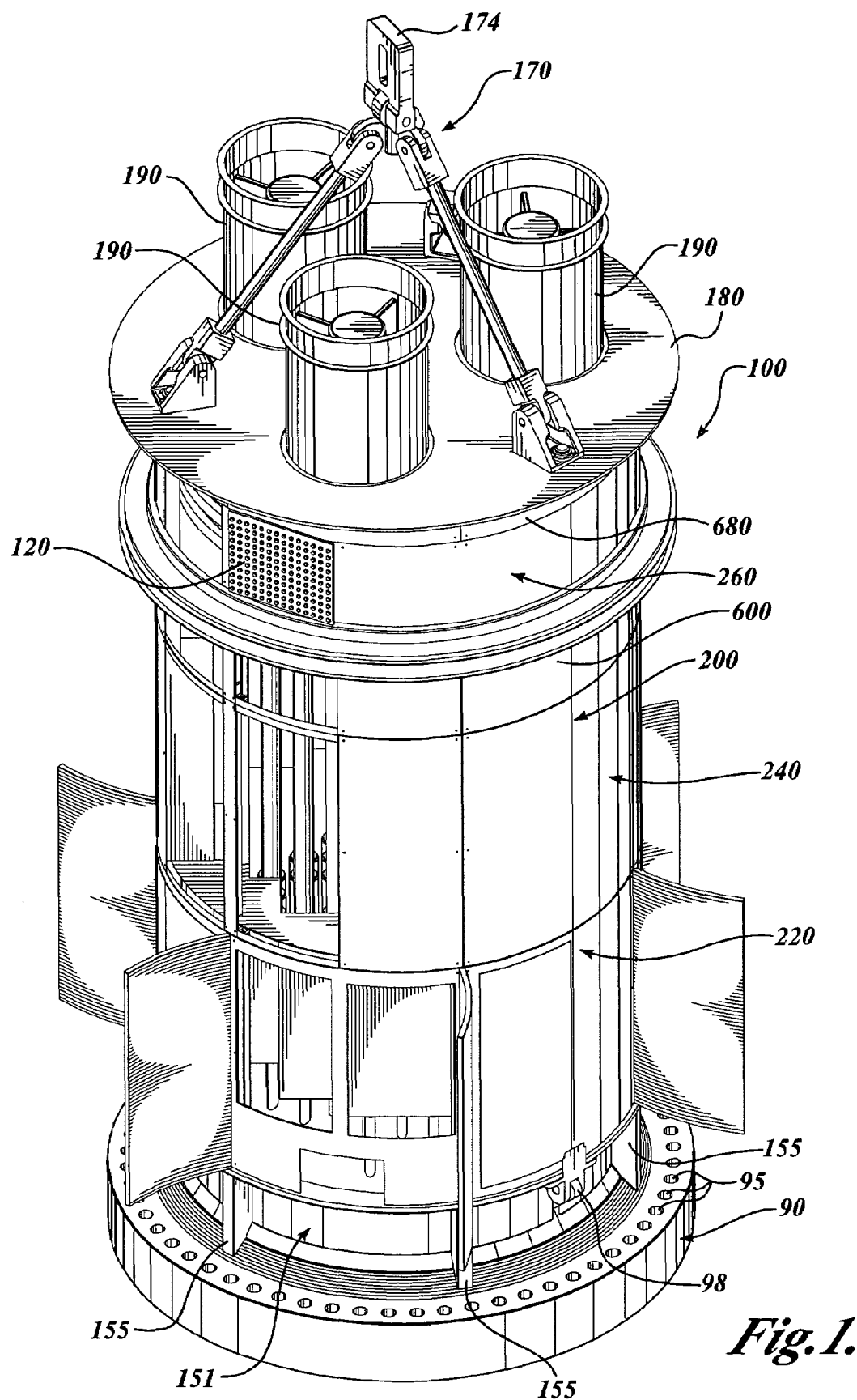
FIG. 1 is a perspective view of an embodiment of an integrated head assembly according to the present invention, shown installed on a reactor vessel closure head.

Referring now to the figures, an integrated head assembly 100 according to the present invention is shown atop a reactor vessel closure head 90 in FIG. 1. The reactor vessel closure head 90 is attachable to the top of a reactor vessel (not shown) and seals the reactor vessel, which contains the nuclear fuel (not shown). As seen more clearly in FIG. 2, the reactor vessel closure head 90 is a circular structure that typically includes a dome-shaped central portion 92 and an outer ring portion 94 having a plurality of stud mounting holes 95. The dome portion 92 supports a number of control rod drive mechanisms (CRDMs) 96 that extend vertically above the reactor vessel closure head 90 and pass through the head into the reactor vessel. The CRDMs 96 are electrically operated devices that control the vertical position of the control rods (not shown) inside the reactor vessel. CRDMs 96 are well known in the art and are therefore depicted in the figures in functional form, without showing the structural detail. For example, CRDMs generally include upwardly extending guide tubes that, for clarity, are not shown in FIG. 2. The reactor vessel closure head 90 includes three integral lifting lugs 98 that are used to facilitate lifting the head for removal and replacement.

The preferred embodiment of the integrated head assembly 100 includes a lift assembly 150 that provides support structure for lifting the reactor vessel closure head 90, a cylindrical shroud assembly 200 that rests atop the reactor vessel closure head 90, a seismic support system 300 (see FIG. 12) that protects the CRDMs 96 and integrated head assembly 100 from seismically-induced loads, a missile shield 400 (see FIGS. 11A and 11B) that provides protection in certain accident scenarios wherein the CRDMs 96 and/or control rods are ejected, a baffle assembly 500 (see FIG. 8) for directing the flow of cooling air to the CRDMs 96, and a CRDM cooling system including cooling air ducts 600 connected through an upper air plenum 680 to cooling fans 190.

The primary components of the lift assembly 150 are shown in FIG. 2. The lift assembly 150 includes a bottom ring beam 151 that sets atop the reactor vessel closure head 90. The ring beam 151 of the preferred embodiment has a short, cylindrical lower portion 152 and a flange portion 153 that extends outwardly from the top edge of the cylindrical portion 152. A plurality of saddle members 155 is disposed peripherally around the ring beam 151, the saddle members 155 having a lower surface that generally conforms with the shape of the reactor vessel closure head 90, thereby distributing the weight of the integrated head assembly 100 over a larger portion of the reactor vessel closure head 90. In the preferred embodiment, the ring beam 151 comprises three generally identical segments that are connected through the lift rod connecting members 162, as described below.

Three lift rods 160 extend vertically upwardly from the ring beam 151. Each lift rod 160 includes a connecting member 162 at one end having a clevis-type connector 163 that slidably engages one of the head lifting lugs 98. The connecting member 162 is attached to the head-lifting lug 98 with a clevis pin 166. A detail of the connecting member 162 of the preferred embodiment is shown in FIG. 3. The connecting member 162 is positioned between ring beam 151 segments, and includes oppositely disposed horizontal flanges 164 that connect to the ring beam 151 with bolts 165, thereby interconnecting the ring beam segments and removably attaching the ring beam 151 to the reactor vessel closure head 90. Although the preferred embodiment utilizes three ring beam segments, it will be appreciated that other configurations are possible and contemplated by the present invention, including, for example, a unitary ring beam having cut out portions to accommodate connecting members.

The upper end of the lift rods 160 are threaded and extend through orifices 182 in a circular fan support plate 180 (see FIG. 10), where they are attached to the fan support plate 180 with the tripod base brackets 172 and/or other suitable connecting hardware. A lift tripod 170 is disposed above the fan support plate 180 and includes three rods 171, each rod 171 pivotally connected at one end to a tripod base bracket 172, and pivotally connected at the opposite end to a lift shackle 174. It will be appreciated that the lift assembly 150 permits the integrated head assembly 100 and the reactor vessel closure head 90 to be lifted as a single unit by an appropriate lifting mechanism, such as a hoist (not shown), acting on the lift shackle 174. It will be appreciated that the fan support plate 180 also functions as a spreader for the lift tripod 170. The three large apertures 184 through the fan support plate 180 are the outlet air ports for the upper air plenum 680 fluidly connected to the cooling fans 190 as described below.

Figure 4:
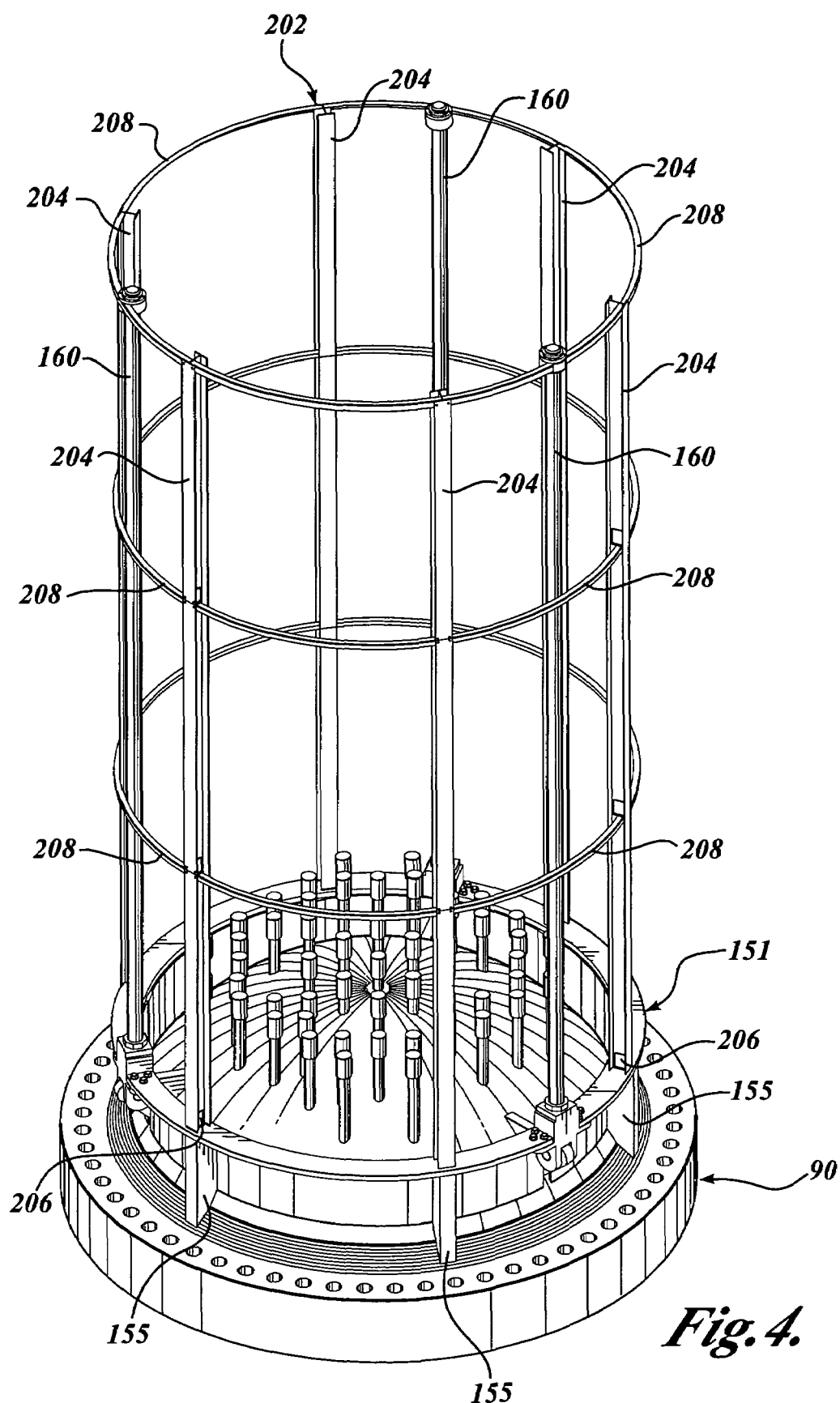
FIG. 4 is a perspective view of the support column assembly of the integrated head assembly shown in FIG. 1.

As seen most clearly in FIG. 4, a generally cylindrical support column assembly 202 is provided on top of the ring beam 151. The support column assembly 202 includes six support columns 204 that extend upwardly from the ring beam 151, each support column 204 preferably being positioned above one of the saddle members 155. The support columns 204 are attached to the ring beam 151 with a clip angle bolted connection 206. Curved transverse members 208 interconnect the support columns 204 at three vertically spaced locations. The support column assembly 202 provides a cylindrical grid support structure over the reactor vessel closure head 90 that supports the integrated head assembly components, and transfers the weight and dynamic loads from the integrated head assembly 100 to the ring beam 151. Although the preferred support structure has been described, it will be apparent to one of skill in the art that many variations in the support structure may be made without departing from the present invention. For example, and not by way of limitation, more or fewer support columns 204 and/or transverse members 208 may be utilized, or the transverse members 208 may be replaced with hoop beams that encircle the support columns.

Figure 5:
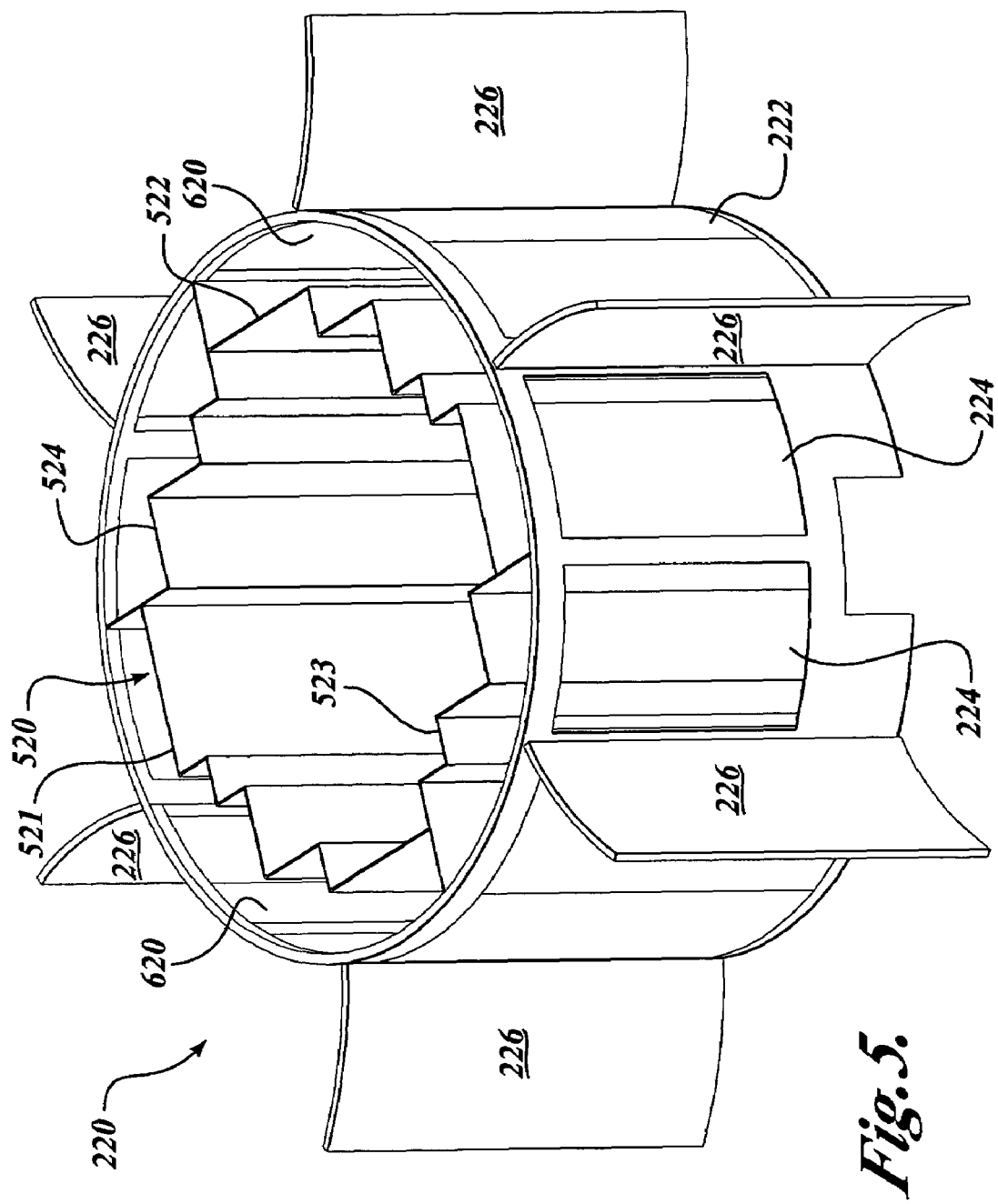
FIG. 5 is a perspective view of the bottom shroud portion of the integrated head assembly shown in FIG. 1.

The shroud assembly 200 of the preferred embodiment includes bottom shroud 220, a middle shroud 240 and an upper shroud 260 (see FIG. 1). The bottom shroud 220, shown in FIG. 5, is a cylindrical assembly that is installed at the lower end of the support column assembly 202, extending upwardly from the ring beam 151. The bottom shroud 220 includes an outer wall panel 222 that is preferably formed in multiple sections. The outer wall 222 includes access openings 224 that provide access to the interior of the shroud assembly 200—for example, to monitor and/or service the CRDMs 96. A plurality of doors 226 are attached at the access openings 224, whereby the access openings 224 can be closed, for example, during operation of the reactor and when access to the interior of the shroud assembly 200 is not otherwise required. It will be appreciated that although hinged attachments are shown, any other suitable closure system could be used—for example, removable panels, sliding panels, and the like. The bottom shroud outer wall 222 and doors 226 may be made from any suitable material such as, for example, ASTM-A36 carbon steel. The thickness of the panel 222 and doors 226 are selected depending on the required level of radiation shielding that is desired. For example, in the preferred embodiment, the panel 222 and doors 226 are ¼ inch thick if radiation shielding is not an issue, and 1½ inches thick if radiation shielding is desired.

A lower baffle portion 520 extends through the bottom shroud 220, comprising a left panel 521, a right panel 522, a forward panel 523, and a rearward panel 524. The baffle panels 521, 522, 523, and 524 are oriented approximately parallel to and generally surround the CRDMs 96. The lower baffle portion 520 defines a central airflow path for cooling airflow. The left and right panels 521, 522, cooperatively with a portion of the outer wall panel 222, form a pair of longitudinal channels 620 near the periphery of the integrated head assembly 100.

Figure 6:
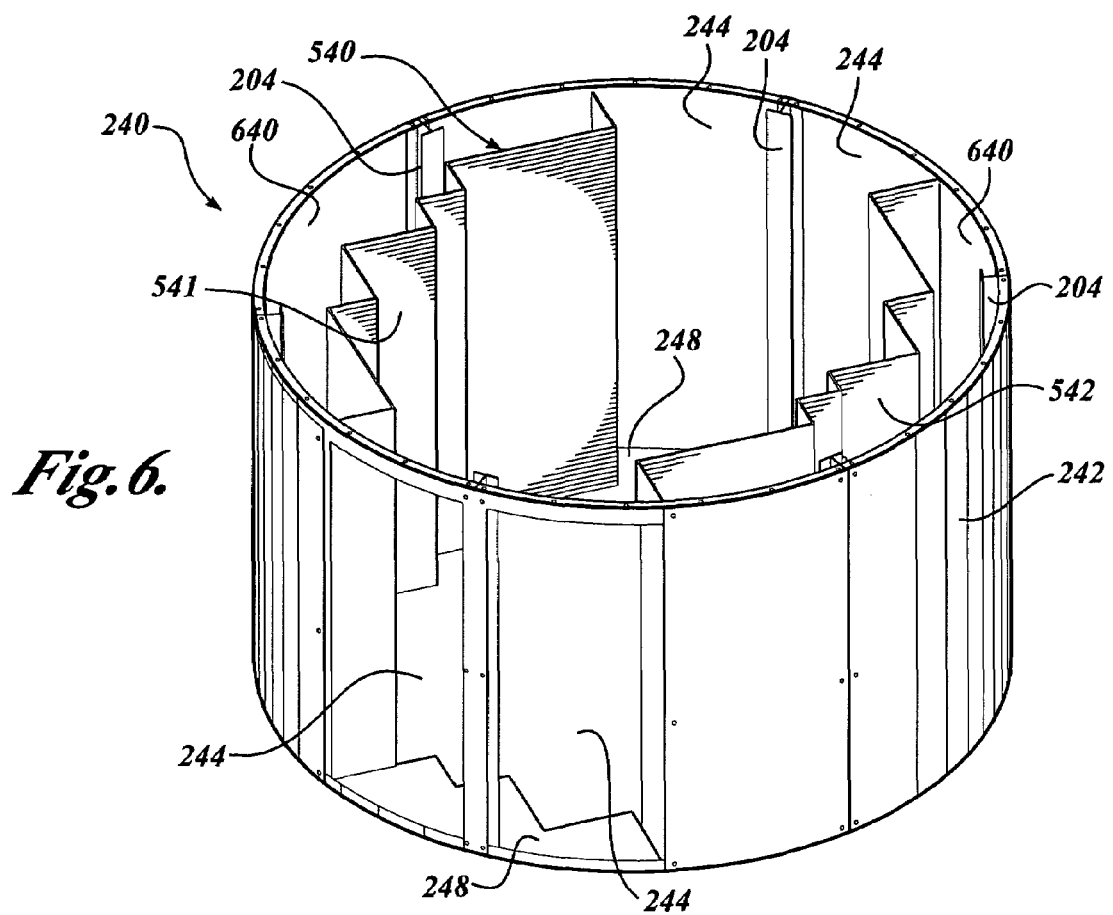
FIG. 6 is a perspective view of the middle shroud portion of the integrated head assembly shown FIG. 1.

Referring now to FIG. 6, a middle shroud 240 is aligned with the bottom shroud 220 and extends upwardly from the bottom shroud 220. Similar to the bottom shroud, the middle shroud 240 includes a multisection outer wall panel 242 that attaches to the support column assembly 202. Air inlet ports 244 are provided on opposite sides of the middle shroud 240 that permit ambient air to enter the shroud assembly 200 for cooling the CRDMs 96. A middle baffle portion 540 of the baffle assembly 500 extends vertically through the middle shroud 240. The baffle middle portion 540 includes a left panel 541 and a right panel 542 that each attach to the shroud outer wall 242, forming a pair of peripheral longitudinal channels 640, aligned with and vertically continuing the channels 620 formed in the bottom shroud 220. The baffle assembly middle portion 540 is preferably open at the oppositely disposed forward and rearward regions between the baffle left and right panels 541, 542, which openings are generally aligned with the shroud air inlet ports 244. Horizontal plates 248 extend inwardly from the bottom of the middle shroud 240 from the air inlet ports 244, such that air entering the air inlet ports 244 is directed to the interior of the baffle assembly 500 towards the CRDMs 96.

Figure 7:
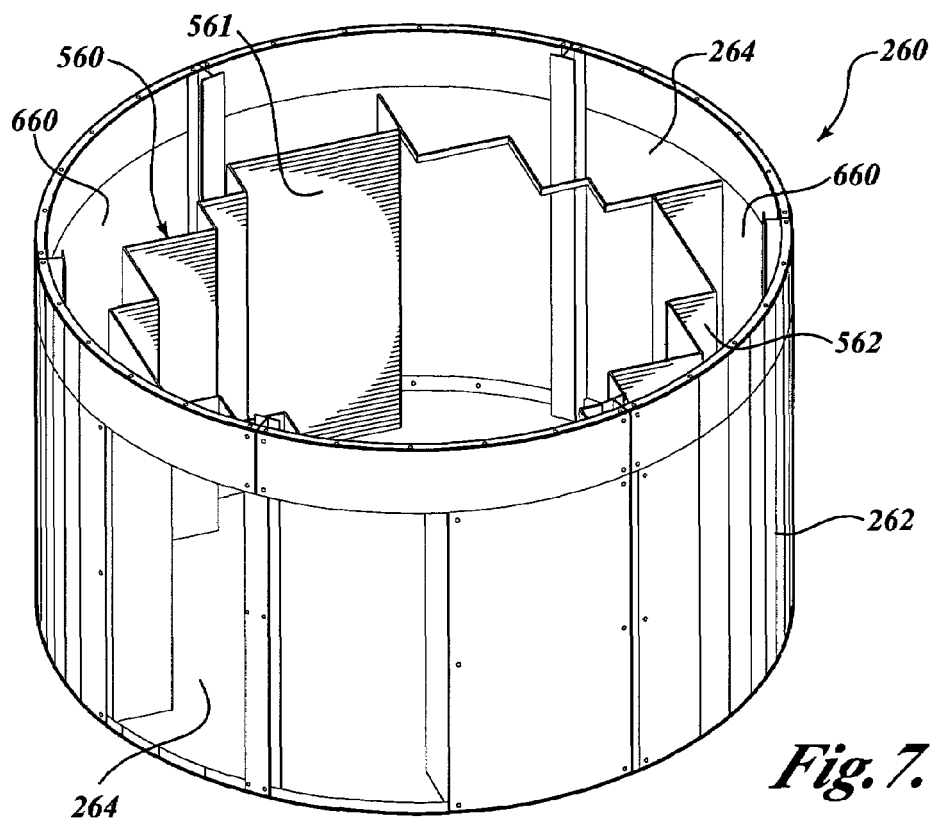
FIG. 7 is a perspective view of the upper shroud portion of the integrated head assembly shown in FIG. 1.

An upper shroud 260 is shown in FIG. 7. The upper shroud 260 extends upwardly from the middle shroud 240 and includes an outer wall 262 that attaches to the support column assembly 202. A baffle upper portion 560 of the baffle assembly 500 extends vertically through the upper shroud 260, including a left panel 561 and a right panel 562, aligned with the middle baffle portion 540. The baffle upper portion 560 and upper shroud outer wall 262 cooperatively form a pair of longitudinal channels 660 aligned with and continuing the middle section channels 640. The forward and rearward portions of the upper shroud 260 have apertures 264 to provide electric power and control access to the CRDMs 96 through a CRDM cable disconnect panel 120 (see FIG. 13). It will be appreciated that the shroud channels 620, 640, and 660 cooperatively form longitudinal cooling ducts 600 that extend from near the reactor vessel closure head 96 upwardly substantially through the length of the shroud assembly 200.

Figure 8:
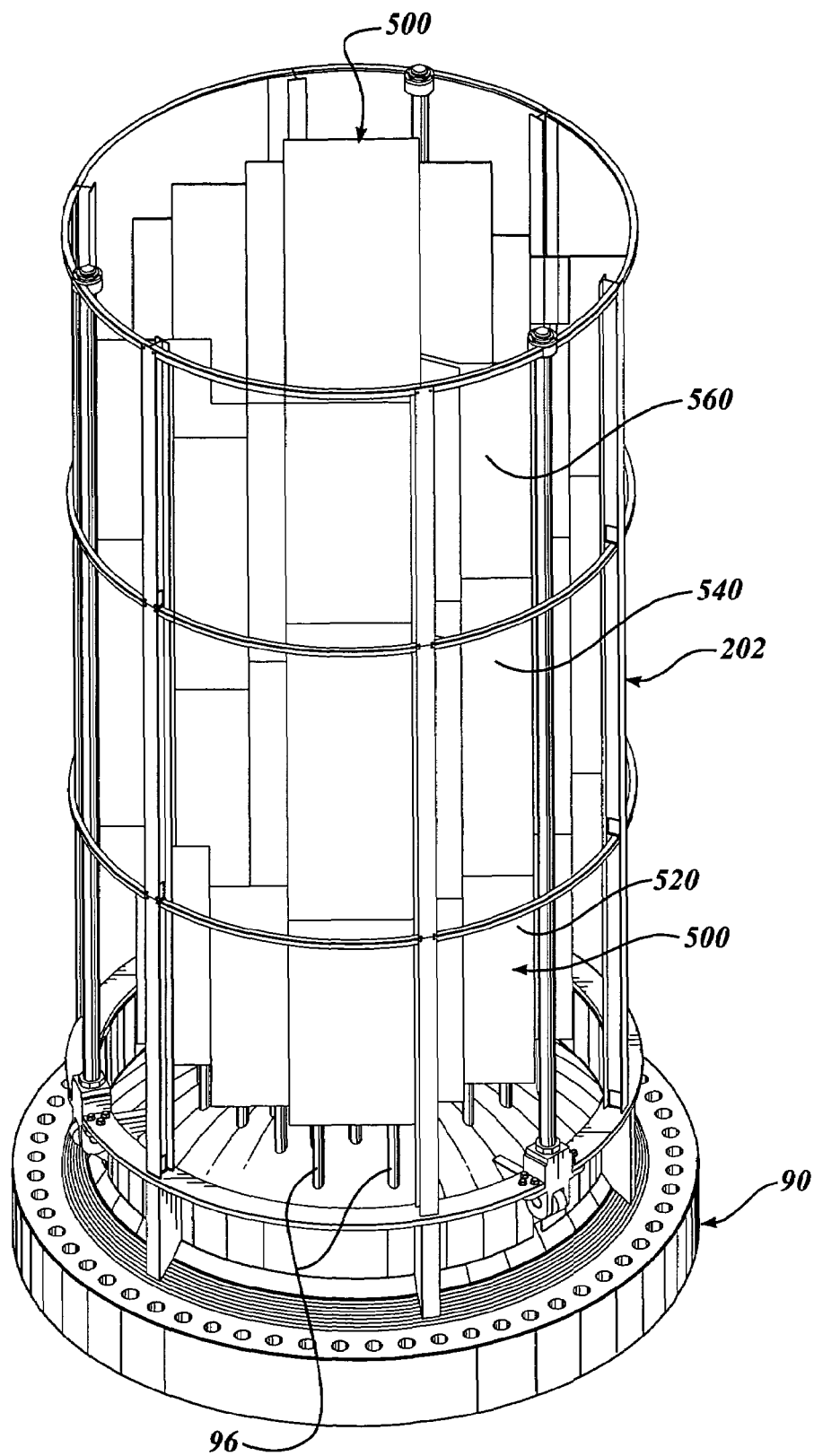
FIG. 8 is a perspective view of the baffle assembly portion inside the support column assembly of the integrated head assembly shown in FIG. 1.

A view of the baffle assembly 500 disposed within the support column assembly 202 is shown in FIG. 8, with the shroud outer walls 222, 242, 262 removed for clarity. The baffle structure 500 extends upwardly from near the reactor vessel closure head 90 and provides a flow path for cooling air to the CRDMs 96. A gap is provided between the reactor vessel closure head 90 and the baffle assembly 500 that functions as an air outlet port such that the cooling air flowing downwardly along the CRDMs 96 exits the baffle and flows outwardly toward the periphery of the integrated head assembly.

Figure 9:
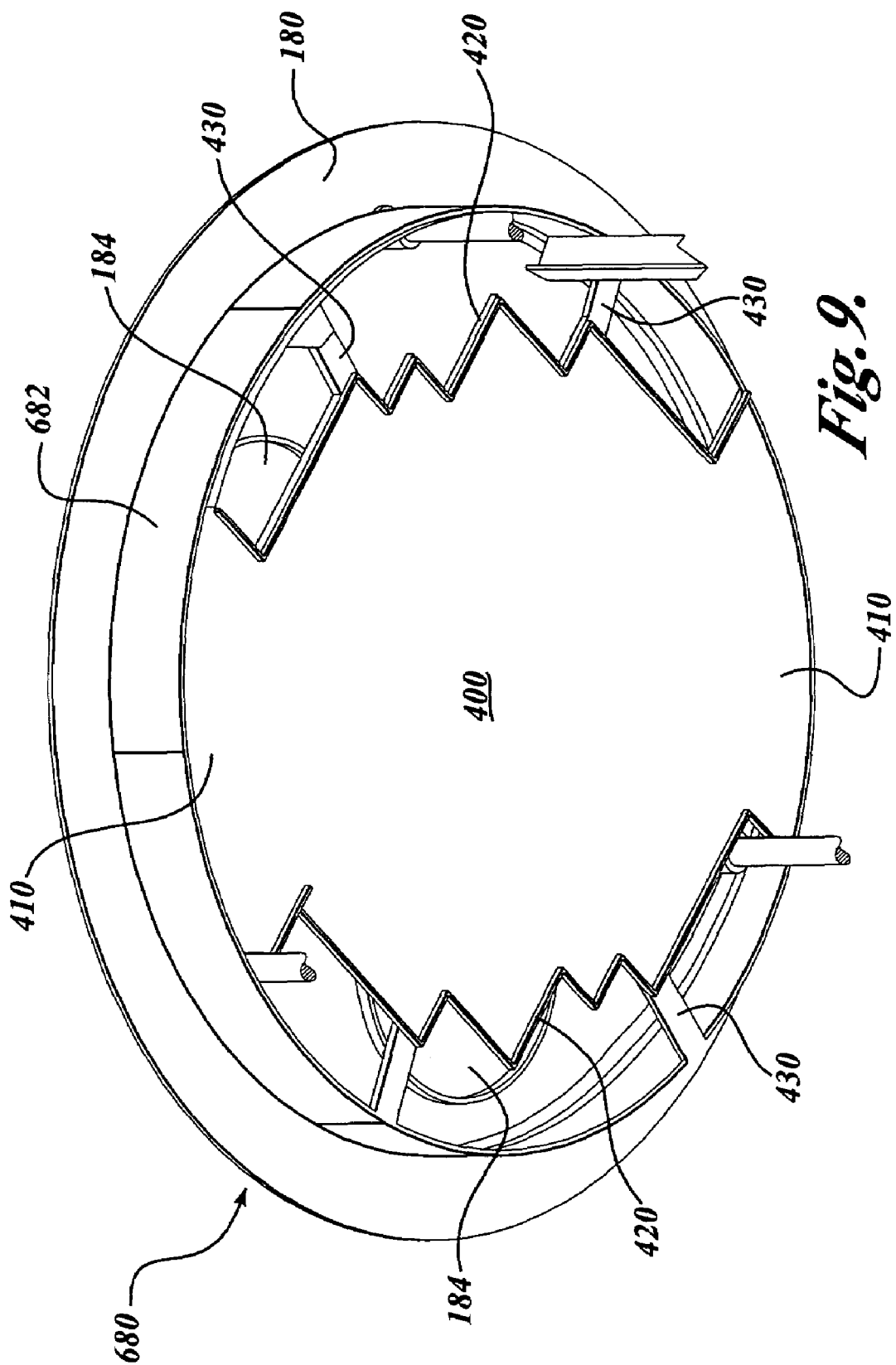
FIG. 9 is a perspective view of the upper air plenum of the integrated head assembly shown in FIG. 1.
Figure 10:
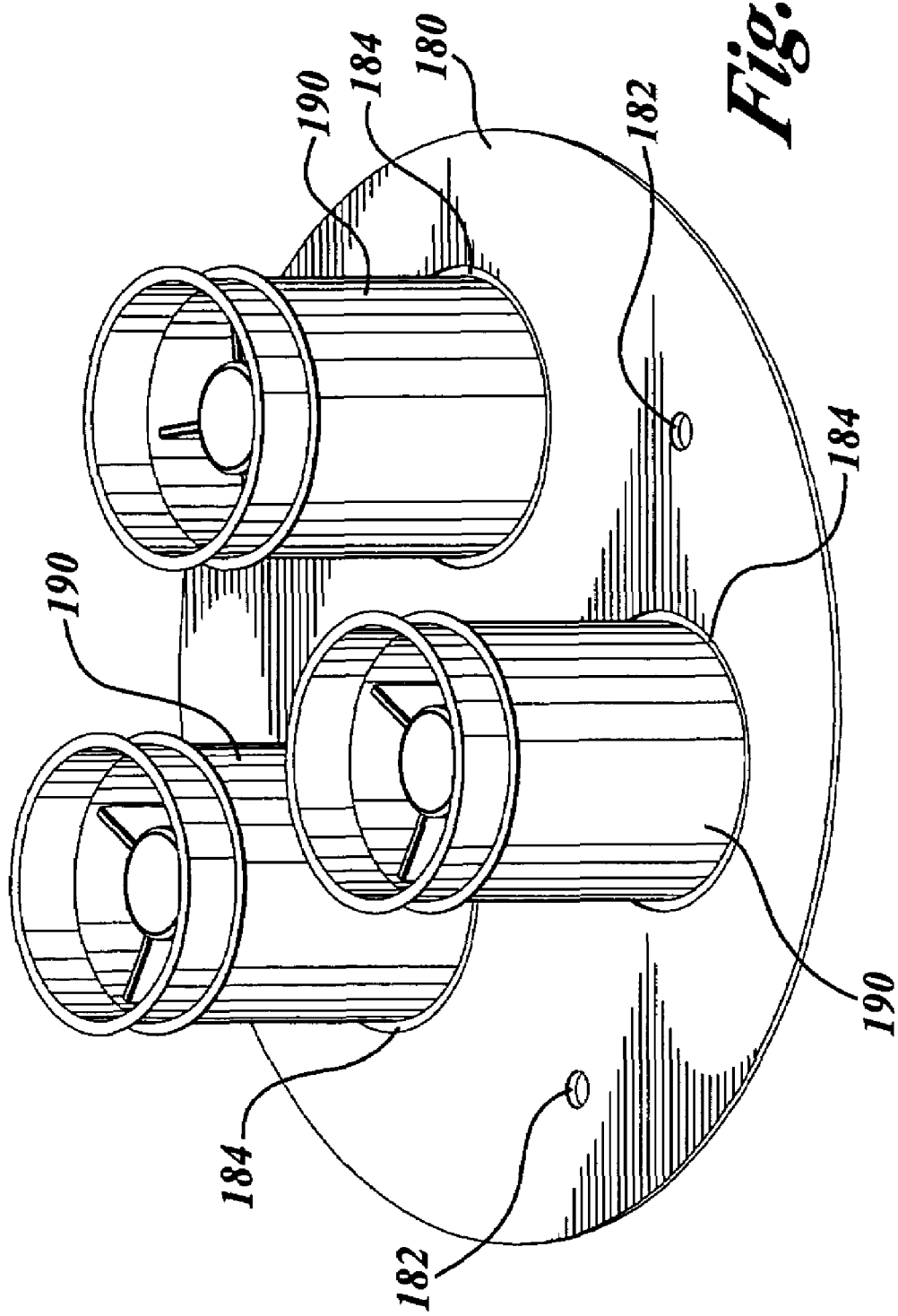
FIG. 10 is a perspective view of the fan support plate, with the fans installed, of the integrated head assembly shown in FIG. 1.

An upper air plenum 680, shown in FIG. 9, is provided at the top of the integrated head assembly 100. The upper air plenum 680 is a generally circular plenum that includes the fan support plate 180 having outlet ports 184 to the cooling air fans 190. The fan support plate 180, with three cooling air fans 190 installed, is shown in FIG. 10. The plenum lower panel comprising the missile shield 400 discussed in more detail below and a vertical peripheral wall 682 are provided between the fan support plate 180 and the missile shield 400. The missile shield 400 includes left and right cutout portions 420 that are disposed over the cooling air ducts 600 and provide the inlet ports to the upper air plenum 680. In the preferred embodiment, the cooling air fans 190 draw air upwardly through the upper air plenum 680. In operation, therefore, the fans 190 draw air into the middle shroud inlet ports 244, downwardly along the CRDMs 96 in the baffle assembly 500, upwardly through the ducts 600 into the upper air plenum 680, and out of the integrated head assembly 100.

Figure 11:
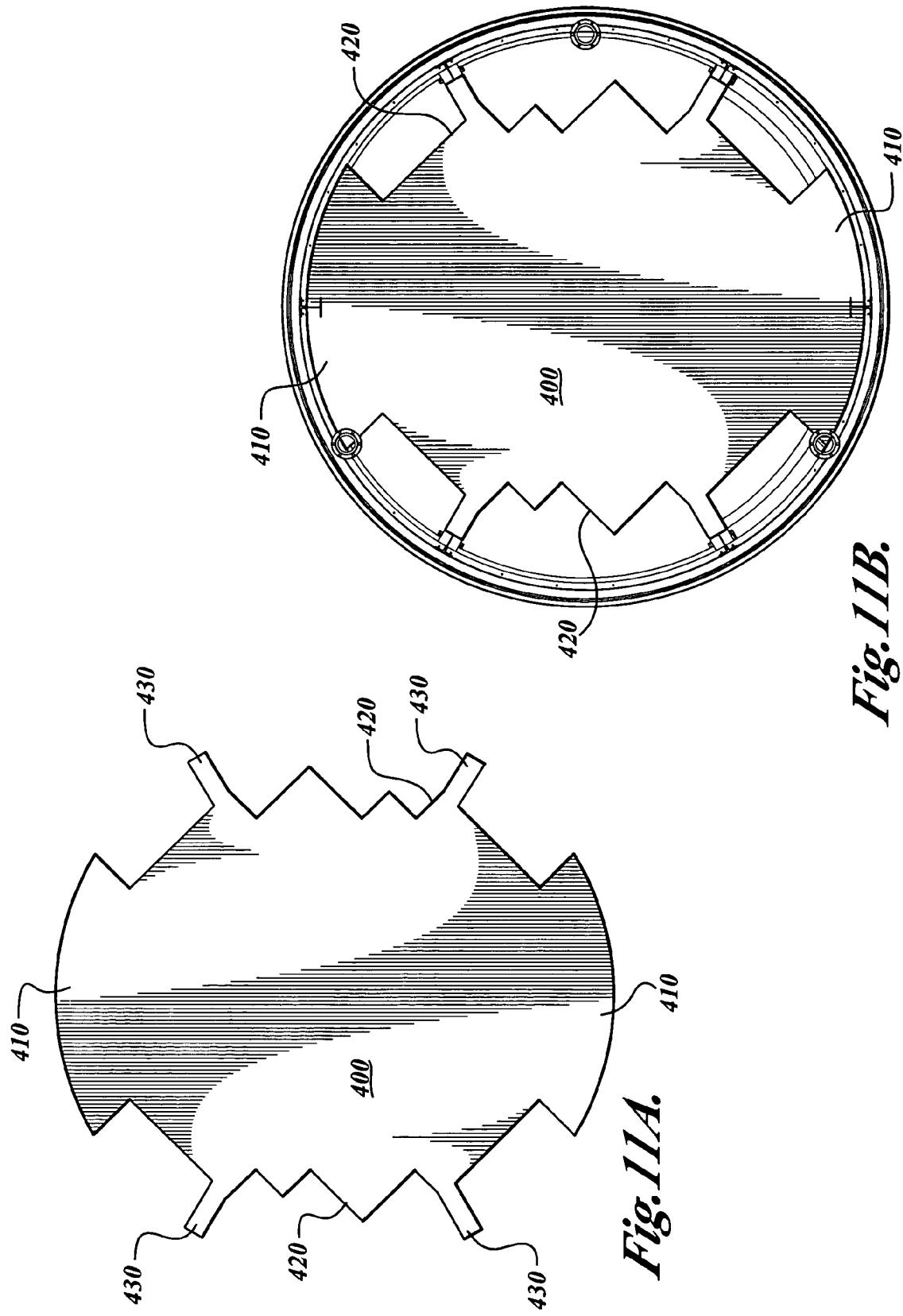
FIGS. 11A and 11B show the missile shield of the integrated head assembly shown in FIG. 1, FIG. 11A showing a plan view of the missile shield in isolation and FIG. 11B showing the missile shield installed in the support structure assembly.

Referring now to FIGS. 11A and 11B, the missile shield 400 is provided above the CRDMs 96 near the top of the baffle assembly 500. The primary purpose of the missile shield 400 is to protect against the possible ejection of the CRDMs 96 or fuel rods in certain accident scenarios. The missile shield 400 may be made from any suitably strong material and is preferably a steel panel having circular forward and rearward portions 410 and cutout left and right portions 420 that are shaped to accommodate the cooling air ducts 600 as discussed above. The missile shield 400 is supported by the support columns 204 and includes outwardly extending tab portions 430 to facilitate attachment to the support columns 204. FIG. 11B shows a plan view of the missile shield 400 installed in the integrated head assembly 100 (with some structural detail removed for clarity).

Figure 12:
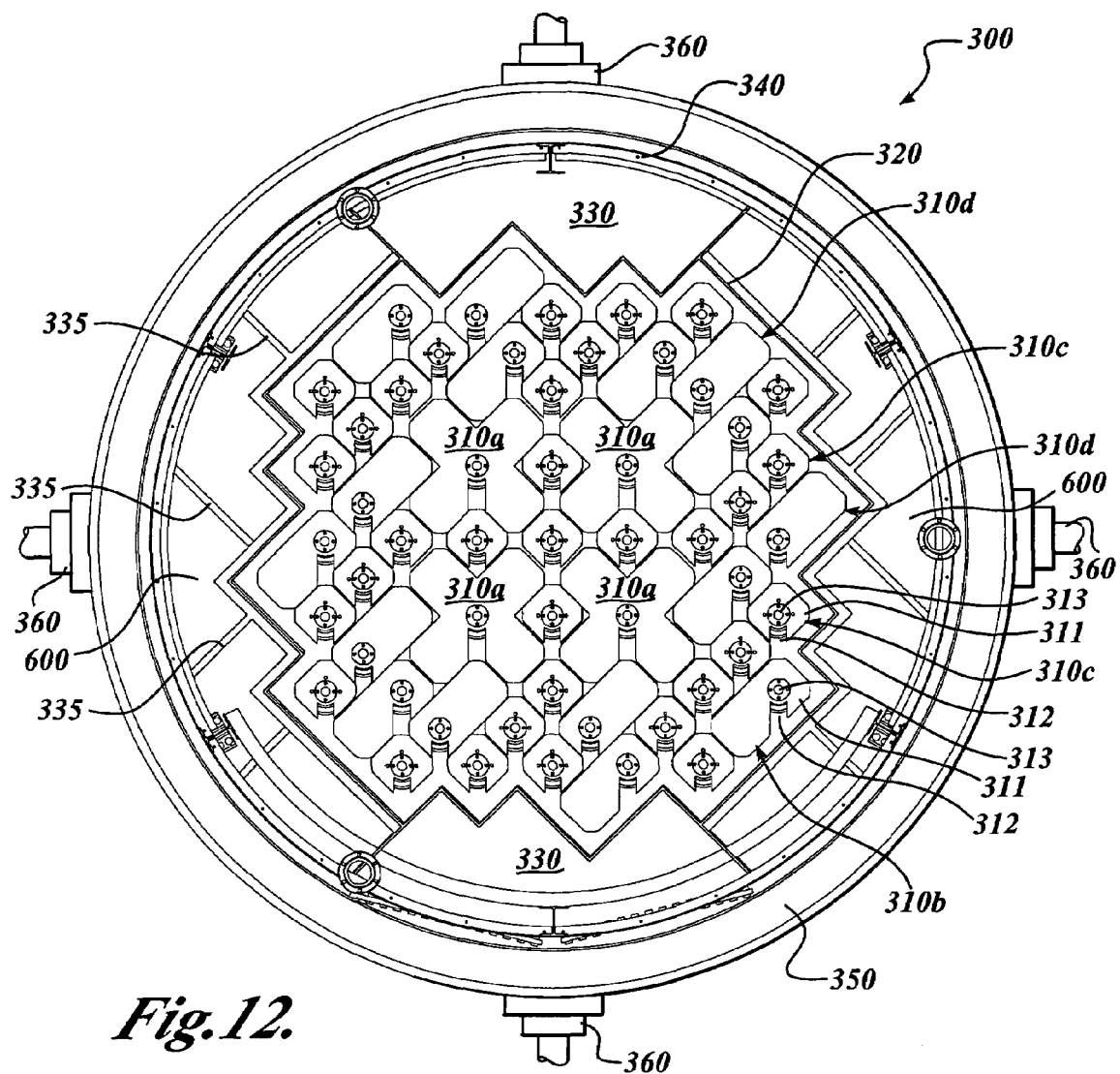
FIG. 12 is a plan view of the seismic support system of the integrated head assembly shown in FIG. 1.

A seismic support system 300 for the integrated head assembly 100 is shown in FIG. 12. The seismic support system 300 is designed to support the CRDMs 96 in a seismic event to ensure that the control rods are able to drop down into the reactor if it is necessary to shut the reactor down. The seismic support system 300 includes an array of seismic cap plates 310 of various shapes (310a, 310b, 310c, and 310d), each seismic cap plate attached to the upper end of a CRDM 96. The seismic cap plates 310 include a generally flat portion 311 with a notched-out section 312 to accommodate electrical power and control cables. A hat-shaped recess or cavity 313 is formed at an intermediate portion of the seismic cap plate 310, and sized to accommodate the end of a CRDM 96. The CRDM 96 extends into the cavity 313 and is attached to the respective seismic cap plate 310. As shown in FIG. 12, the flat portions 311 of the cap plates 310 are approximately adjacent neighboring cap plates 310, such that the cap plates 310 cooperatively form a lateral support panel across the CRDMs 96.

A baffle stiffener ring beam 320 surrounds the seismic cap plate 310 array, and preferably a plurality of adjustable engagement mechanisms (not shown) are provided between the cap plate 310 array and the baffle stiffener ring beam 320, whereby only a slight gap is provided therebetween. A seismic ring beam 340, comprising a generally circular beam, surrounds the baffle stiffener ring beam 320 and is connected to the ring beam 320 with forward and rearward seismic stiffener plates 330 and left and right seismic stiffener beams 335. In the preferred embodiment, a bolt tensioner rail 350 is provided on the outer perimeter of the seismic ring beam 340 to accommodate a bolt tensioning/detensioning apparatus (not shown). A plurality of seismic restraints 360 connects the seismic ring beam 340 to a relatively stable anchor such as the reactor containment walls (not shown).

Figure 13:
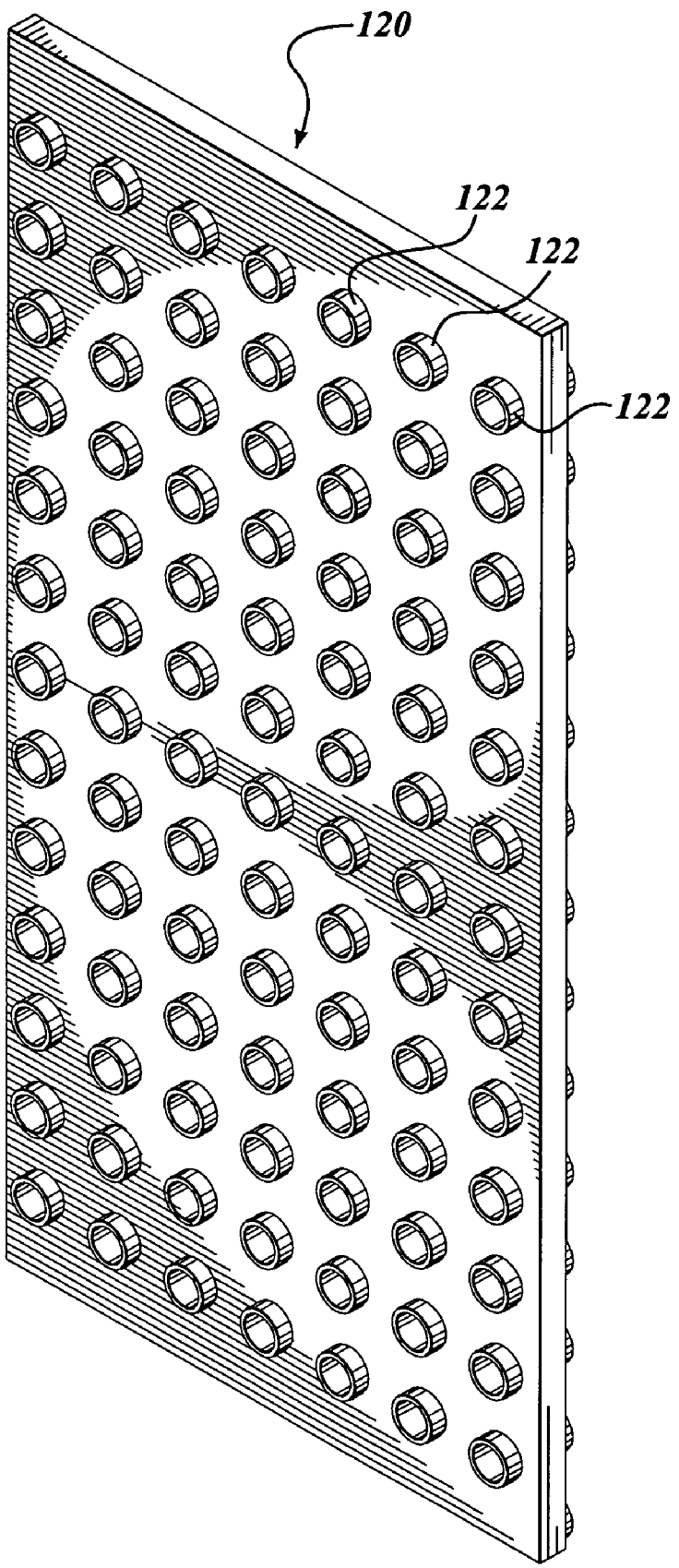
FIG. 13 is a perspective view of the CRDM cable disconnect panel that is installed in the upper shroud of the integrated head assembly shown in FIG. 1.

FIG. 13 shows the CRDM cable disconnect panel 120 discussed above, which is preferably installed in the upper shroud 260. The cable disconnect panel 120 provides an array of electrical connectors 122 providing a central location to disconnect the CRDMs 96 from their electric power and control systems prior to removal of the reactor vessel closure head 90. More than one cable disconnect panel 120 may be provided.

The integrated head assembly 100 of the present invention simplifies the removal and replacement of the reactor vessel closure head 90 for standard maintenance procedures, as well as for unscheduled outages, by integrating the lifting support, CRDM cooling system, missile shield, and seismic support into a single assembly that may be removed as a unit from the reactor vessel. In practice, to remove the integrated head assembly a polar crane hook or other appropriate lifting and moving mechanism is attached to the tripod assembly lift shackle 174, the CRDM cables are disconnected at the cable disconnect panel 120, the seismic restraints 360 are disconnected, and the reactor vessel closure head studs are loosened and removed. Additional site-specific steps well known in the art and not important to understanding of the present invention may also be required, such as moving one or more cable bridges away from the lift path of the head. The reactor vessel closure head can then be removed from the reactor vessel to permit the necessary maintenance procedures to be performed.

Although the preferred embodiment has been described in some detail, it will be readily apparent to one of skill in the art that many variations in the present invention may be made without departing from the present invention.

It will be appreciated that the present invention is amenable to retrofitting of existing nuclear power plants. No modifications to the reactor vessel closure head 90 would be required.

In a preferred method of retrofitting an existing plant, it is contemplated that the design, fabrication, and installation effort for the integrated head assembly 100 of the present invention would be performed over a period of approximately 24 calendar months. The integrated head assembly 100 installation would preferably be performed during a refueling outage of the plant, such as are typically scheduled every 18 months. Accordingly, the design/fabrication/installation process needs to be scheduled based on the plant refueling schedule. The integrated head assembly shroud assembly 200 and associated components may be fabricated and shipped in three modules. The first module comprises the bottom ring beam 151, the bottom shroud 220, the baffle lower portion 520, and other appurtenances associated with the bottom shroud 220. The second module would comprise the middle shroud 240, the baffle middle portion 540, including the cooling air inlets, and other associated appurtenances. The third module would include the upper shroud 260, baffle upper portion 560, partial air inlet, partial assembly of the CRDM 96 seismic support system 300, and related head area cable support systems and wires in pre-routed condition, the cable disconnect panel(s) 120, the missile shield 400, the cooling fans 190, and other associated appurtenances. It is contemplated, although clearly not critical to the present invention, that the three lift rods 160 and the lift tripod 170 would be shipped as separate items.

The assembly of these components would preferably be accomplished while the reactor vessel closure head 90 is resting on a reactor head stand inside the containment. In a typical installation, the existing rig assembly would first be disassembled from the reactor vessel closure head 90. The three lift rods 160 are then attached to the three lift lugs 98 on the reactor vessel closure head 90. Temporary supports are preferably provided at the top of the lift rods 160 to hold them in place. Assembly of integrated head assembly components is accomplished starting from the bottom of the integrated head assembly (i.e., near the reactor vessel closure head 90) and continuing on in upward direction. The first module is inserted through three lift rods 160 and the bottom ring beam 151 is attached to the connecting members 162 of the lift rods 160. Once the lower shroud 220 is in place, the second module is lowered through the lift rods 160 and bolted to the bottom shroud 220 at the transverse members (i.e., ring angles) 208 and at the support columns 204. For accessibility for bolted connections, some or all of the outer wall panel 242 of the middle shroud 240 may be removed from the shroud.

It is possible that the elevation of the top of the second module is very close to the elevation of the CRDM seismic cap plates 310. In such cases, install all CRDM seismic cap plates 310 on all CRDMs 96 prior to lowering the third module over the lift rods 160. In the next step of this preferred method, lower the third module through three lift rods 160 and attach it to the top of the middle shroud 240 by bolts at the transverse members 208 as well as at the support columns 204. Again for accessibility for bolted connections, some or all of the outer wall panel 262 of the upper shroud 260 may be removed from the shroud. The installation of the CRDM seismic support system 300 may be completed at this time, excepting attachment of the seismic restraints 360. The seismic restraints 360 are preferably installed when the integrated head assembly is in place atop the reactor vessel. After the third module is assembled and installed, the missile shield 400 may be installed along with the cooling fan support plate 180 including the rest of the upper air plenum 680, the cooling fans 190, and the lift tripod 170.

After the cooling fan base is installed, the refueling disconnect panels may be installed near the bottom surface of the cooling fan support plate 180. The retrofit is completed with the assembly of miscellaneous non-structural elements. After the assembly is complete, the whole integrated head assembly 100 with the reactor vessel closure head 90 is lifted and held in a lifted position for some time by the containment polar crane and then put back on the head stand. At this time all component connections are checked once again for their effectiveness. When it is ready to install the reactor vessel closure head 90 back on the reactor vessel, the entire integrated head assembly 100, with the reactor vessel closure head 90, is lifted from the head stand and moved over the reactor vessel and lowered slowly until the head is properly aligned and resting on the reactor vessel, and the assembly is attached to the reactor vessel. After the reactor vessel closure head studs are properly torqued, the seismic restraints 360 are attached to the integrated head assembly 100 on one side and to the refueling walls on the other side. After the integrated head assembly is installed it is contemplated that airflow test would be performed to ensure proper operation of the cooling fans 190 and the entire CRDM cooling system.

It will be apparent to one of skill in the art that other assembly methods are possible although less preferred, including, for example, installing or partially installing the integrated head assembly to the reactor vessel closure head while it is attached to the reactor vessel, or installing the integrated head assembly to the reactor vessel closure head utilizing more smaller modules, or fewer larger modules. In particular, it is contemplated that the integrated head assembly 100 could be substantially completely assembled prior to installing it on the reactor vessel closure head.

As discussed above, some commercial nuclear reactors require that the lead screw from each control rod be decoupled from the control rod and parked prior to removal of the reactor vessel closure head. Such reactors typically require significant headroom over the reactor vessel in order to decouple and park the control rod lead screws. A second embodiment of the present invention that provides substantial reactor vessel headroom, is shown in FIGS. 14 to 20.

Figure 14:
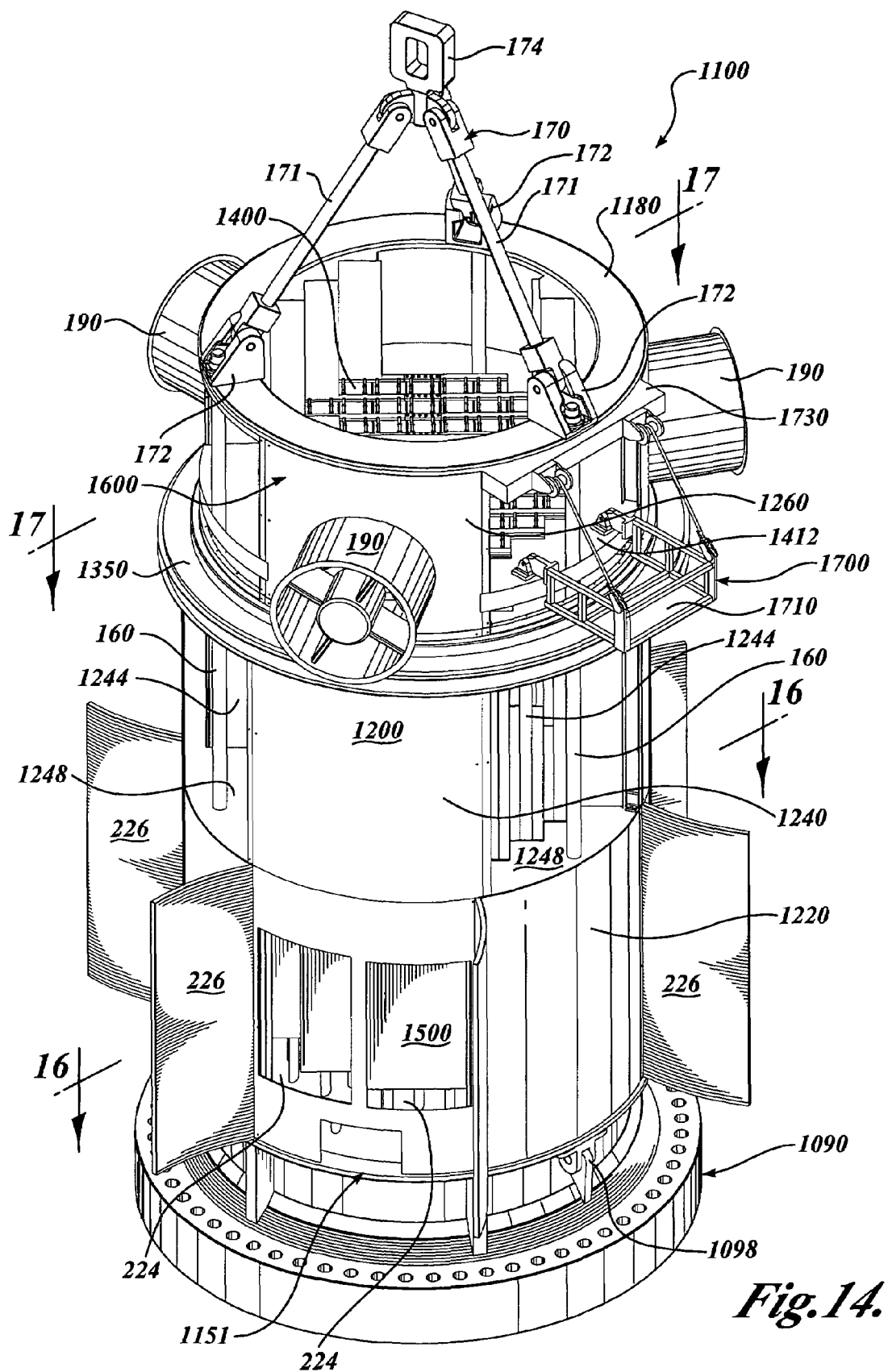
FIG. 14 is a perspective view of a second embodiment of an integrated head assembly according to the present invention, shown installed on a reactor vessel closure head.
Figure 15:
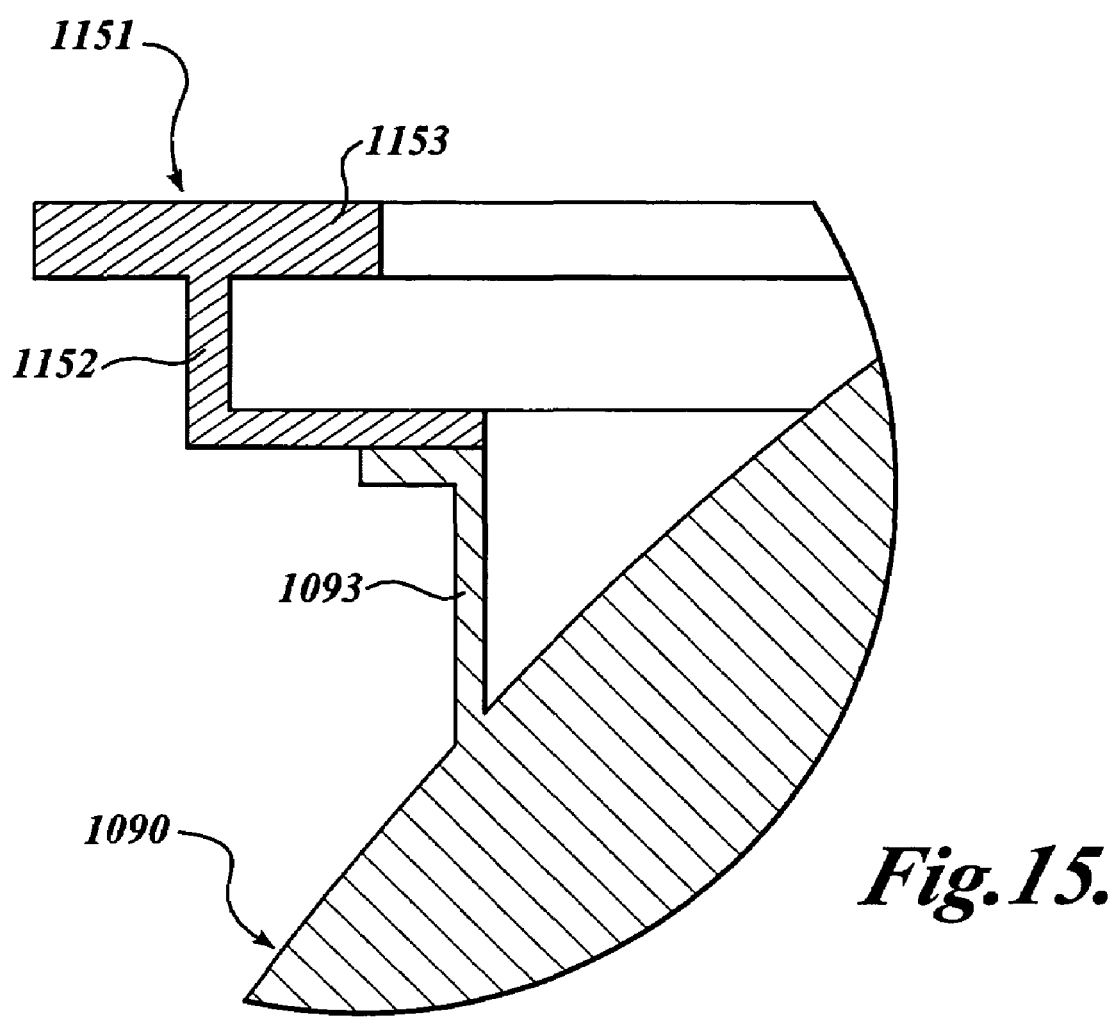
FIG. 15 is a fragmentary sectional view showing the lower ring beam of the integrated head assembly of FIG. 14 resting on an upwardly extending flange on the reactor vessel closure head.
Figure 16:
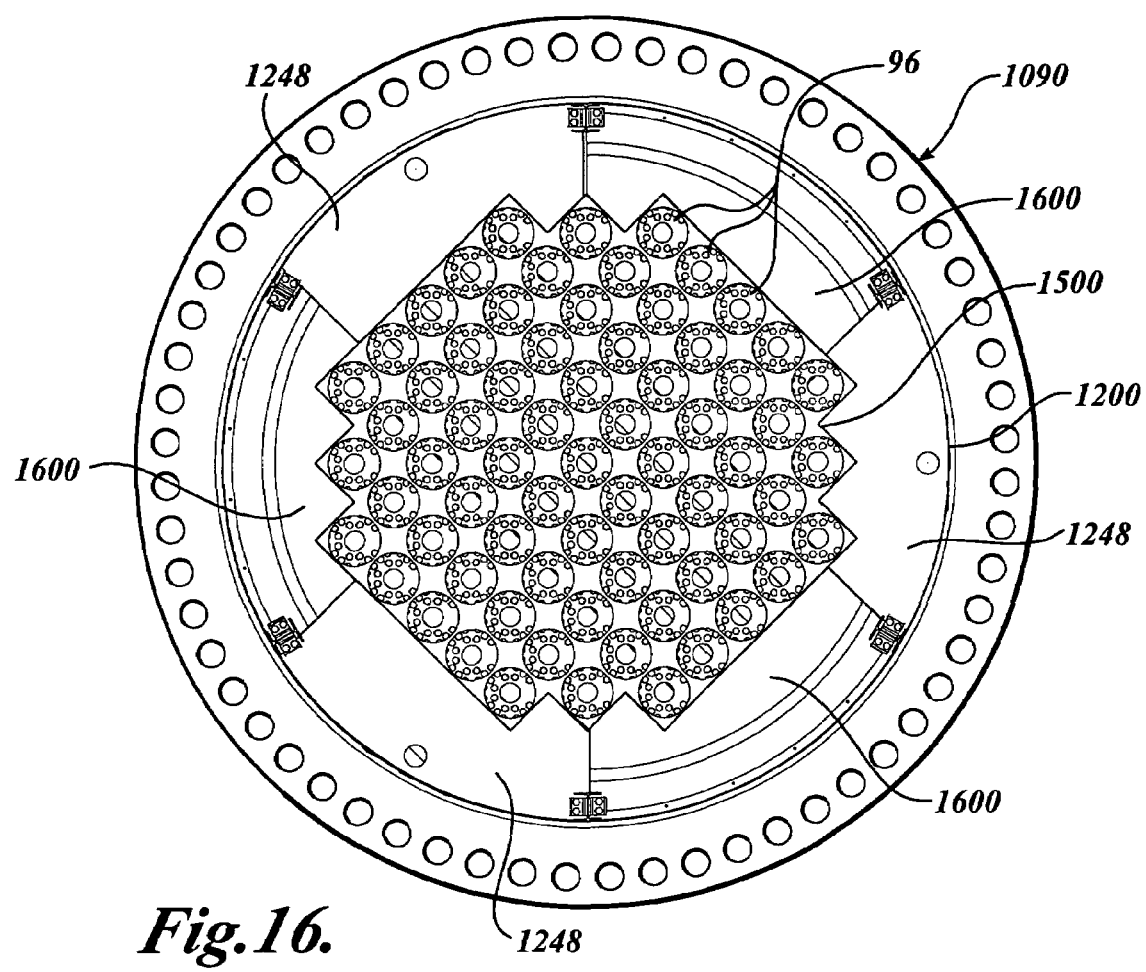
FIG. 16 is a plan view of the integrated head assembly of FIG. 14 through section 16—16.

Referring now to FIG. 14, a perspective view of a second embodiment of an integrated head assembly 1100 according to the present invention is shown. The integrated head assembly 1100 includes three lift rods 160 that attach to lifting lugs 1098 on a reactor vessel closure head 1090—for example, in a manner similar to that shown in FIG. 3. Although it is not essential to the present invention, in the disclosed example the reactor vessel closure head 1090 includes an upwardly-extending flange 1093, generally in the shape of an inverted "L," as seen most clearly in FIG. 15. Such flanges are a common feature of certain existing commercial light water reactor designs.

The integrated head assembly 1100 includes a ring beam 1151 having an L-shaped lower portion 1152 that is adapted to rest atop the reactor vessel closure head flange 1093. It will be appreciated that this configuration distributes the weight of the integrated head assembly 1100 over a large portion of the reactor vessel closure head 1090. As on the first embodiment disclosed above, the ring beam 1151 also includes a ring-shaped horizontal flange portion 1153. The ring beam 1151 may further be attached to the reactor vessel closure head flange 1093—for example, with nuts and bolts or other clamps (not shown) as are well known in the art. In the preferred embodiment, the ring beam 1151 is formed in three approximately 120° segments, although more or fewer segments that cooperatively form a ring beam are also contemplated by the present invention.

The integrated head assembly 1100 includes a lift assembly having three lift rods 160 (two shown in FIG. 14) that connect at the lower end to the lifting lugs 1098 on the reactor vessel closure head 1090 (for example, with clevis-type connecting members 162) and at the upper end to a lift tripod 170 (for example, with tripod base brackets 172). The lift assembly is generally the same as that shown in FIG. 2, except that an upper ring beam 1180 acts as a spreader for the lift tripod 170 (rather than the fan support plate 180). The upper ring beam 1180 is an annular beam, thereby providing access to the interior of the integrated head assembly 1100 from above. The upper end of the lift rods 160 are threaded and extend through orifices in the upper ring beam 1180, where they are attached to the upper ring beam 1180 with the tripod base brackets 172 and/or other suitable connecting hardware. The lift tripod 170 is disposed above the upper ring beam 1180, and includes three rods 171, each rod 171 pivotally connected at one end to one of the tripod base brackets 172 and pivotally connected at the opposite end to a lift shackle 174. It will be appreciated that the lift assembly 170 permits the integrated head assembly 1100 and the reactor vessel closure head 1090 to be lifted as a single unit by an appropriate lifting mechanism, such as a hoist (not shown), acting on the lift shackle 174.

A generally cylindrical shroud assembly 1200 extends upwardly from the ring beam 1151, preferably including a bottom shroud 1220, a middle shroud 1240, and an upper shroud 1260. Access doors 226 are provided in the bottom shroud 1220 over access openings 224. A baffle assembly 1500 extends upwardly from the reactor vessel closure head 1090, the baffle assembly being attached to the shroud assembly 1200, and cooperatively with the shroud assembly 1200 forming a plurality of vertical cooling air ducts 1600 that extend upwardly for a substantial portion of the integrated head assembly height. In the preferred embodiment three cooling air ducts 1600 are provided, circumferentially spaced around the integrated head assembly 1100, as seen most clearly in FIG. 16.

Referring again to FIG. 14, three cooling fans 190 are installed in the vertical wall of the upper shroud 1260. The cooling fans 190 are directed outwardly, and each fan 190 is fluidly connected to one of the vertical cooling air ducts 1600, to draw air upwardly through the air duct 1600. Inlet ports 1244 through the middle shroud 1240 and the baffle assembly 1500 provide a flow path for cooling air to enter the integrated head assembly 1100 for cooling the control rod drive mechanisms 96. Horizontal plates 1248 are provided at the inlet ports 1244 between the shroud wall and the baffle assembly 1500. It will now be appreciated that the cooling fans 190 operate to draw ambient air into the integrated head assembly 1100 through the inlet ports 1244. The air flows into the baffle assembly 1500 and downwardly over the CRDMs 96 convectively cooling the CRDMs 96, and into the inlet disposed at the bottom of the cooling air ducts 1600, where the air flows upwardly and out of the assembly 1100 through the cooling fans 190. Although the upper end of the cooling air ducts 1600 of the preferred embodiment are not fluidly interconnected at the top end, it is contemplated that an annular upper air plenum (not shown) could be provided to fluidly connect the cooling air ducts 1600. An upper air plenum would improve airflow over the control rods 96 if one or two of the fans 190 fail or are otherwise not operational.

Figure 17:
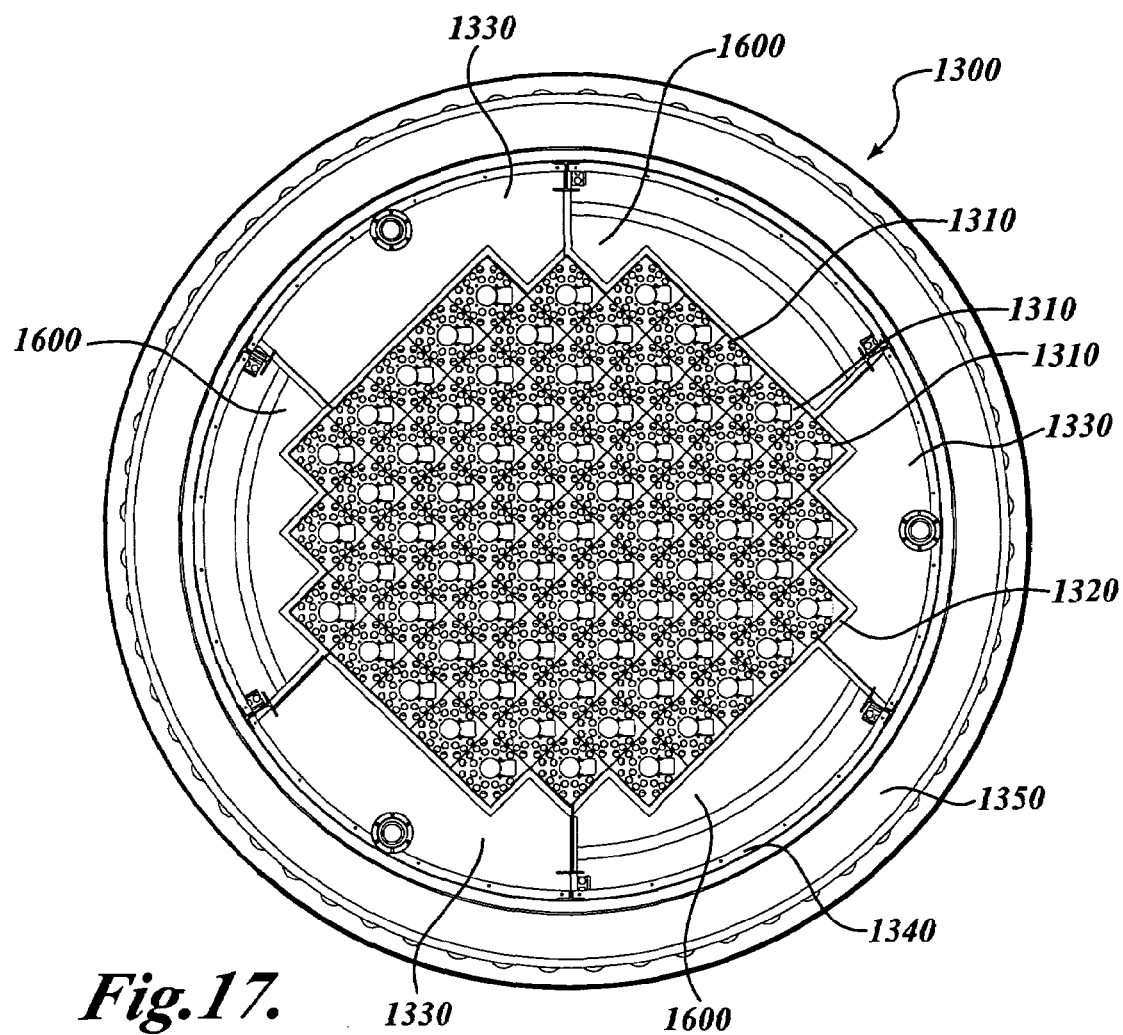
FIG. 17 is a plan view of the integrated head assembly of FIG. 14 through section 17—17.
Figure 18:
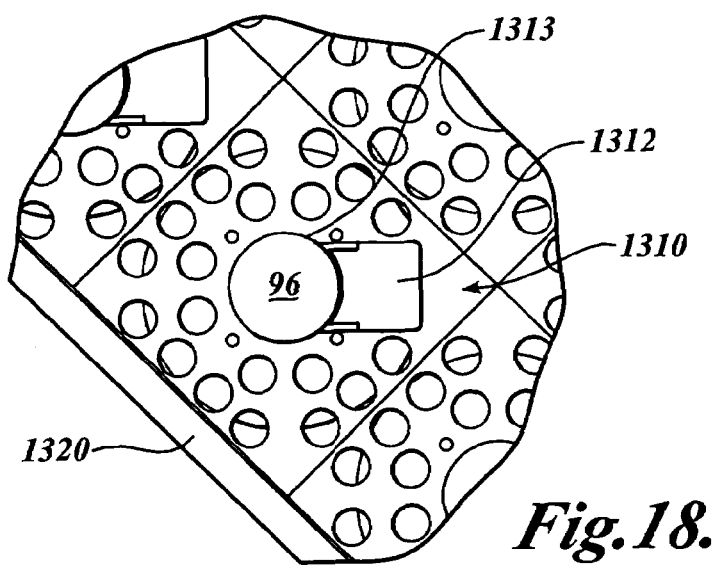
FIG. 18 is a fragmentary close-up view of seismic support plates shown in FIG. 17.

A seismic support system 1300 for the integrated head assembly 1100 is shown in FIG. 17. The seismic support system stabilizes the CRDMs 96 in a seismic event to ensure that the control rods are able to drop down into the reactor if it is necessary to shut the reactor down. In this embodiment, the seismic support system 1300 includes an array of seismic support plates 1310 having an aperture 1313 that is sized to slidably receive the end of a CRDM 96. The seismic support plates 1310 include a second aperture 1312, which may overlap the first aperture, to accommodate electrical power and control cables and piping for the CRDM stator cooling water. A seismic support plate 1310 is provided for each CRDM 96, forming an array of plates as shown in FIG. 17, and the seismic support plate 1310 clamps to the CRDM 96. As shown in FIGS. 17 and 18, the seismic support plates 1310 are approximately adjacent to neighboring seismic support plates 1310, such that the seismic support plates 1310 cooperatively form a lateral support panel across the CRDMs 96. Although the seismic support plates are shown fixedly attached to each CRDM 96, is it also contemplated that the seismic support plates 1310 may alternatively loosely engage the CRDMs 96 and be attached to a rectangular grid frame structure (not shown) that holds the seismic support plates 1310 in proper alignment.

A baffle stiffener ring beam 1320 surrounds the seismic cap plate 1310 array. Adjustable engagement mechanisms (not shown) may be provided between the cap plate 1310 array and the baffle stiffener ring beam 1320, to adjustably maintain a slight gap therebetween. A seismic ring beam 1340, comprising a generally circular beam, surrounds the baffle stiffener ring beam 1320, and is connected to the ring beam 1320 with a plurality of seismic stiffener plates 1330. In the preferred embodiment, a bolt tensioner rail 1350 is provided on the outer perimeter of the seismic ring beam 1340 to accommodate a bolt tensioning/detensioning apparatus (not shown). In this embodiment the seismic support system does not include any seismic restrains for connection to the containment wall. The seismic forces are therefore transmitted to the reactor vessel closure head 1090 through the integrated head assembly 1100 structure.

Figure 19:
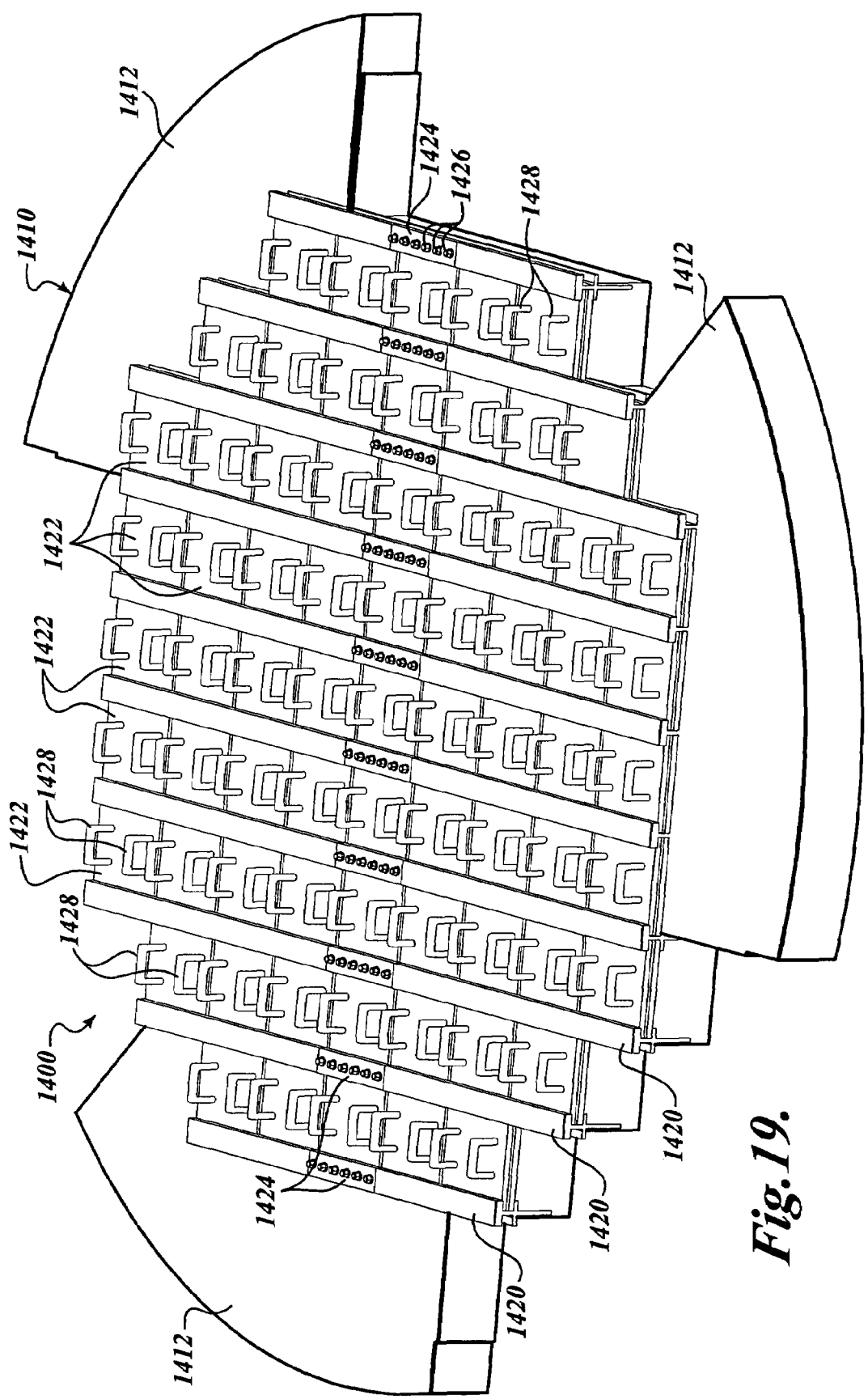
FIG. 19 is a perspective view of the missile shield for the integrated head assembly shown in FIG. 14.

A missile shield assembly 1400 is disposed above the seismic support system 1300, as shown in more detail in FIG. 19. The missile shield assembly 1400 includes a support structure 1410 including three work platforms 1412 that are circumferentially spaced around the missile shield assembly. A sliding frame structure comprising a number of parallel slotted beams 1420 is disposed generally between the work platforms 1412. A plurality of missile shield plates 1422 are slidably inserted between adjacent slotted beams 1420, as shown in FIG. 19. The missile shield plates 1422 are arranged in an array between adjacent slotted beams 1420 substantially filling the area between the work platforms 1412 over the CRDMs 96. A central portion of each slotted beam 1420 is provided with a removable frame member 1424 that is secured to the slotted beam 1420, for example, with bolts 1426, such that removal of adjacent frame members 1424 will permit the missile shield plate 1422 disposed therebetween to be lifted out. It will be apparent from FIG. 19 that if a shield plate 1422 in any row of shield plates is removed, adjacent shield plates 1422 in the same row can be slidably moved to provide access therebelow. In the preferred embodiment, the missile shield plates 1422 are each provided with a pair of handles 1428 to facilitate sliding the shield plates 1422 within the slotted tracks. In the embodiment shown in FIG. 19, the shield plates 1422 are sized such that one shield plate 1422 is disposed directly above each one of the CRDMs 96. It is also preferred that the missile shield assembly 1400 be made from a suitable material to provide radiation shielding to workers above the missile shield assembly 1400, and that the assembly be sturdy enough to safely support such workers.

It should now be appreciated that the missile shield assembly 1400 disclosed above provides a work platform directly over the CRDMs 96, whereby the 15-foot tool can be inserted into the CRDM casing to decouple and park the lead screw in each CRDM 96 so that the reactor vessel closure head 1090 can be removed. It will also be appreciated that by removing only a single shield plate 1422 at a time and sliding adjacent shield plates 1422 to access the desired CRDM 96, the workers' radiation exposure will be minimal when performing this task.

Figure 20:
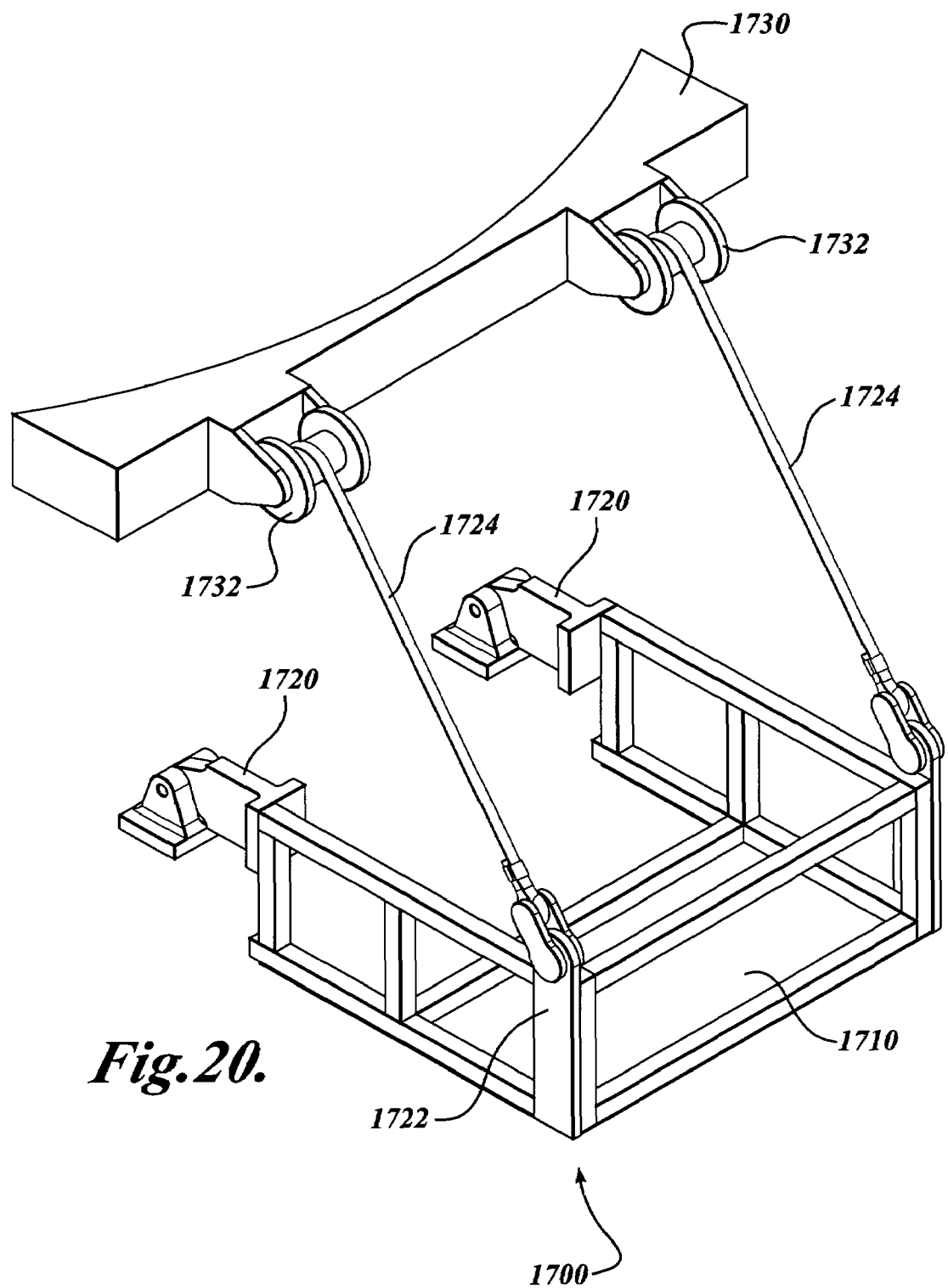
FIG. 20 is a perspective view of the retractable cable bridge for the integrated head assembly shown in FIG. 14.

As seen most clearly in FIGS. 14 and 20, in the disclosed embodiment the integrated head assembly 1100 is provided with a retractable cable bridge 1700. The retractable cable bridge 1700 provides a platform for supporting cables that provide electric power and control signals (i.e., rod position indicator cables) to the CRDMs 96. The cables are preferably removably connected to the CRDMs 96 through a CRDM cable disconnect panel 120 such as that described above and shown in FIG. 13. The cable bridge 1700 includes a support platform 1710 that is pivotally connected at an inner end 1720 to a work platform 1412 of the missile shield assembly 1400. A pair of cables 1724 pivotally connects an outer end 1722 of the support platform 1710 to the upper ring beam 1180 through an attachment bracket 1730. A pair of motorized pulleys 1732 is provided to retract and extend the cable bridge 1700, as desired.

While the preferred embodiment of the invention has been illustrated and described, it will be appreciated that various changes can be made therein without departing from the spirit and scope of the invention.

What is claimed is:

1. A missile shield assembly comprising:
 a first beam that is horizontally oriented, the first beam defining a first elongate slot along at least one side of the first beam, the first beam further having a removable frame member that provides access to the first elongate slot;
 a second beam that is parallel to the first beam, the second beam defining a second elongate slot that faces the first elongate slot, the second beam further having a removable frame member that provides access to the second elongate slot;
 attachment hardware that releasably attaches the removable frame members to the first and second beams; and
 a plurality of shield plates, each shield plate being sized to slidably engage the first and second elongate slots such that the shield plates are retained by the first and second beams.

2. The missile shield assembly of claim 1, wherein the missile shield further comprises a plurality of horizontal work platforms.

3. The missile shield assembly of claim 1, wherein the shield plates further comprise an upwardly extending handle.

4. The missile shield assembly of claim 1, wherein the shield plates are formed from a suitable radiation shielding material.

5. The missile shield assembly of claim 4, wherein the shield plates are formed from carbon steel.

6. The missile shield assembly of claim 1, further comprising a second plurality of shield plates and a plurality of additional beams similar to the first and second beams, the additional beams having elongate slots and removable frame members that provide access to the elongate slots, the additional beams being oriented parallel to the first and second beams and spaced to slidably retain the second plurality of shield plates.

7. The missile shield assembly of claim 1, wherein the attachment hardware comprises a plurality of bolts.

8. A missile shield assembly comprising:
 a support structure including at least a first work platform and a second work platform;
 a sliding frame structure comprising a plurality of parallel slotted beams, each of the slotted beams defining an elongate slot, wherein the slotted beams are disposed between the first work platform and the second work platform; and
 a plurality of missile shield plates slidably retained by the slotted beams;
 wherein at least some of the plurality of parallel slotted beams include a removable frame member and attachment hardware releasably attaching the removable frame member to the associated slotted beam, such that removal of the removable frame member defines a gap that provides access to the elongate slot defined by the associated slotted beam, and such that at least one of the plurality of missile shield plates is removable.

9. The missile shield assembly of claim 8, wherein the attachment hardware comprises a plurality of bolts and further, wherein the removable frame member comprises a plate secured to the slotted beam with the plurality of bolts.

10. The missile shield assembly of claim 8, wherein at least some of the plurality of missile shield plates are slidably retained by the slotted beams in a row, such that the missile shield plates in the row are each removable by sliding the missile shield plates to the gap defined by removal of the removable frame member and lifting the missile shield plate away from the slotted beam.

11. The missile shield of claim 10, wherein each of the missile shield plates includes a handle to facilitate lifting the missile shield plate.

12. A missile shield assembly comprising:
a support structure means including a plurality of work platforms;
a sliding frame structure including a plurality of opposed elongate slots defining a plurality of horizontal tracks, a plurality of removable frame members and attachment hardware that releasably attaches the removable frame members to the sliding frame structure; and
a plurality of carbon steel shield plates slidably retained in the plurality of horizontal tracks;
wherein removing the removable frame members provides access to the plurality of horizontal tracks such that the plurality of shield plates are individually removable.

* * * * *